United States Patent
Shimada et al.

(10) Patent No.: US 7,358,344 B2
(45) Date of Patent: Apr. 15, 2008

(54) AZO DYE

(75) Inventors: Yasuhiro Shimada, Minami-ashigara (JP); Yasuhiro Ishiwata, Minami-ashigara (JP); Makiko Yokoi, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 303 days.

(21) Appl. No.: 10/980,786

(22) Filed: Nov. 4, 2004

(65) Prior Publication Data

US 2005/0119467 A1 Jun. 2, 2005

(30) Foreign Application Priority Data

Nov. 7, 2003 (JP) ............... 2003-379148

(51) Int. Cl.
*C09B 29/033* (2006.01)
*C09B 29/036* (2006.01)
*C09B 29/039* (2006.01)
*C09B 29/12* (2006.01)

(52) U.S. Cl. ............ 534/732; 534/788; 534/795; 8/690; 8/691

(58) Field of Classification Search ......... 534/732 M, 534/788, 795, 732; 8/690, 691
See application file for complete search history.

(56) References Cited

U.S. PATENT DOCUMENTS

| 2,700,669 | A | * | 1/1955 | Scalera et al. ............... 548/259 |
|---|---|---|---|---|
| 3,751,406 | A | | 8/1973 | Bloom |
| 3,955,918 | A | * | 5/1976 | Lang .............................. 8/426 |
| 4,741,997 | A | * | 5/1988 | Sato et al. .................... 430/562 |
| 5,021,334 | A | | 6/1991 | Koya |
| 5,643,709 | A | * | 7/1997 | Kamio et al. ............... 430/201 |
| 6,437,169 | B1 | | 8/2002 | Ito et al. |
| 7,083,655 | B2 | * | 8/2006 | Pratt et al. ..................... 8/405 |
| 2003/0204094 | A1 | | 10/2003 | Uchida et al. |
| 2004/0019982 | A1 | * | 2/2004 | Pratt et al. ..................... 8/405 |

FOREIGN PATENT DOCUMENTS

| JP | 08-319432 | * | 12/1966 |
|---|---|---|---|
| JP | 63-121049 | * | 5/1988 |
| WO | WO 02/083662 A2 | | 10/2002 |

OTHER PUBLICATIONS

Galal et al., Drug Research, 1(2), 125-145, 1968.*
Marengo et al., Chemometrics and Intelligent Laboratory Systems, 14(1-.3), 225-233, 1992.*
Savarino et al., Dyes and Pigments 9(4), 295-304, 1988.*
King-Thom Chung; Environ. Carcino. & Ecotox. Revs., C18(1), pp. 51-74, 2000.

* cited by examiner

*Primary Examiner*—Fiona T Powers
(74) *Attorney, Agent, or Firm*—Birch, Stewart, Kolasch & Birch, LLP

(57) ABSTRACT

An azo dye represented by formula (I):

$$A-N=N-B \qquad \text{formula (I)}$$

wherein, A represents a group having a substituent required for inducing an intramolecular nucleophilic substitution reaction with a nitrogen atom of a reduced azo group as a nucleophilic species when the azo group is reductively decomposed, the group forming a compound containing the nitrogen atom in a ring structure, and B represents an aromatic or hetero ring which is bound to the azo group through a carbon atom.

3 Claims, No Drawings

AZO DYE

FIELD OF THE INVENTION

The present invention relates to an azo dye which is excellent in dyeing power and is harmless.

BACKGROUND OF THE INVENTION

The azo dyes have been used in various uses. The number of types of marketed azo dyes is about 3,000, and the intended uses thereof include many grounds, e.g., for clothes, printing, cosmetics, medical cares, and foods. Therefore, influences of the azo dyes on environments assumed to be, and considerable amounts of the azo dyes would spread to the natural world. Chung et al have reported that 50% or more of the azo dyes actually used remain in the natural world without changing or with gradually degrading (see, e.g., Chung et al., "Environ. Carcino. & Ecotox. Revs." C18(1):51-74, 2000).

Recently, primarily in Europe, there has been a movement to regulate certain azo dyes with laws in the light of safety, and there is a tendency to establish an act concerning this. For example, in 1996, the use of textiles containing 20 types of aromatic amines produced by reductive decomposition of azo groups was regulated in Germany.

Therefore, the azo dyes with high safety have been required, and among others, development of dyes where compounds produced by reductive decomposition of the azo groups are stable and hardly decomposed has become important.

SUMMARY OF THE INVENTION

The present invention resides in an azo dye represented by formula (I):

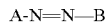

formula (I)

wherein, A represents a group having a substituent required for inducing an intramolecular nucleophilic substitution reaction with a nitrogen atom of a reduced azo group as nucleophilic species when the azo group is reductively decomposed, the group forming a compound containing the nitrogen atom in a ring structure, and B represents an aromatic or hetero ring which is bound to the azo group through a carbon atom.

Other and further features and advantages of the invention will appear more fully from the following description.

DETAILED DESCRIPTION OF THE INVENTION

According to the present invention, there are provided the following means.

(1) An azo dye represented by formula (I):

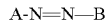

formula (I)

wherein, A represents a group having a substituent required for inducing an intramolecular nucleophilic substitution reaction with a nitrogen atom of a reduced azo group as nucleophilic species when the azo group is reductively decomposed, the group forming a compound containing the nitrogen atom in a ring structure, and B represents an aromatic or hetero ring which is bound to the azo group through a carbon atom.

(2) The azo dye represented by formula (I) described in item (1), wherein the A has a halogen atom, a cyano group, an alkoxycarbonyl group, an aryloxycarbonyl group, a heterocyclicoxycarbonyl group, a carbamoyl group, an acyl group, an acylamino group, an alkoxycarbonylamino group, an aminocarbonylamino group, an aryloxycarbonylamino group, or a group represented by formula (II), as the group having a substituent required for inducing an intramolecular nucleophilic substitution reaction with a nitrogen atom of a reduced azo group as a nucleophilic species:

formula (II)

wherein, Q represents an atomic group required for forming a ring, represents an atomic group composed of carbon atoms which form a benzene ring, naphthalene ring, or the like when the ring is an aromatic ring, and represents an atomic group which is preferably a 5- or 6-membered ring, has at least one hetero atom, and is composed of carbon atoms and/or hetero atoms when the ring is a hetero ring, and $R_{104}$ represents a substituted or unsubstituted alkyl group, a substituted or unsubstituted aryl group, an alkoxy group, an aryloxy group, a heterocyclic oxy group, or a perfluoroalkyl group.

(3) The azo dye represented by formula (I) described in item (1), wherein the azo group is reductively decomposed, and subsequently a cyclization reaction represented by a scheme I is caused:

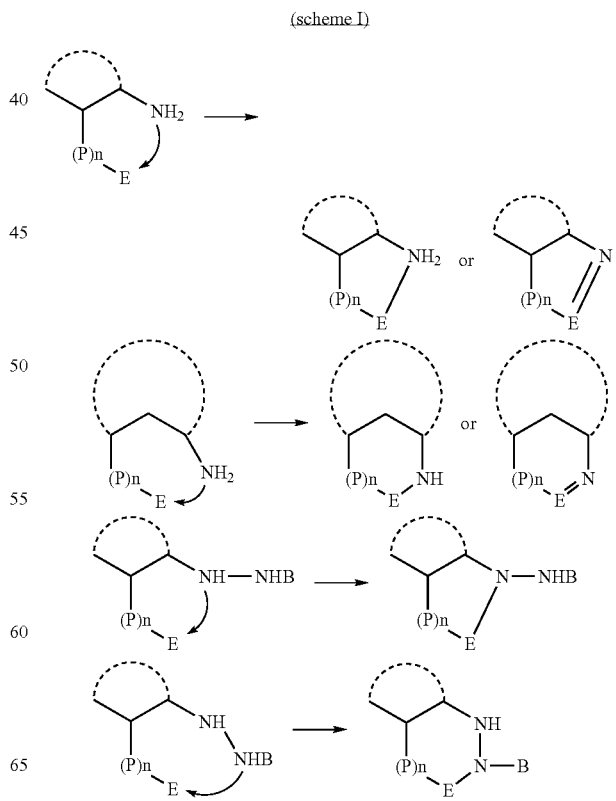

(scheme I)

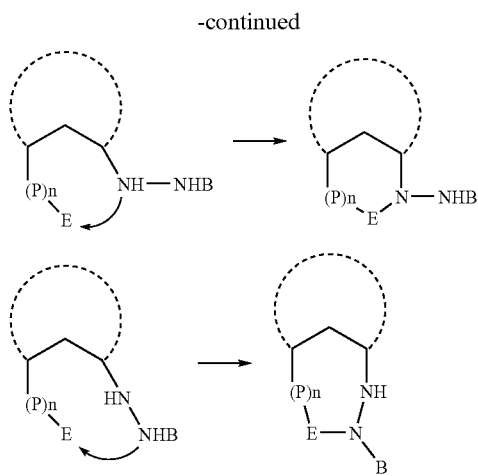

wherein, E represents an electrophilic site, P represents a linking group capable of forming a compound including the nitrogen atom in the ring structure by a nucleophilic substitution reaction of a produced amino group or a produced hydrazino group with the electrophilic site E when the azo group is reductively decomposed, and n represents an integer of 0 to 2, and B is the same as that defined above.

(4) The azo dye represented by formula (I) described in item (1), wherein the A is represented by any one of formulae (A1) to (A10):

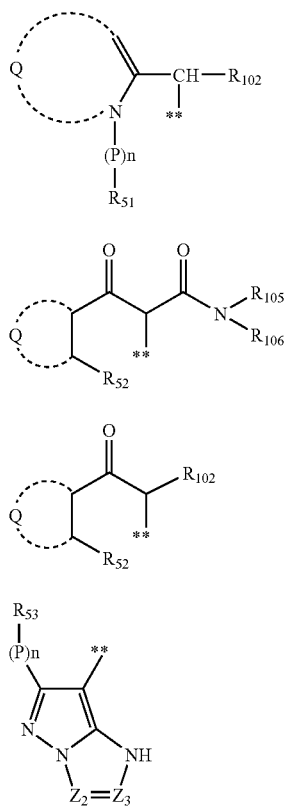

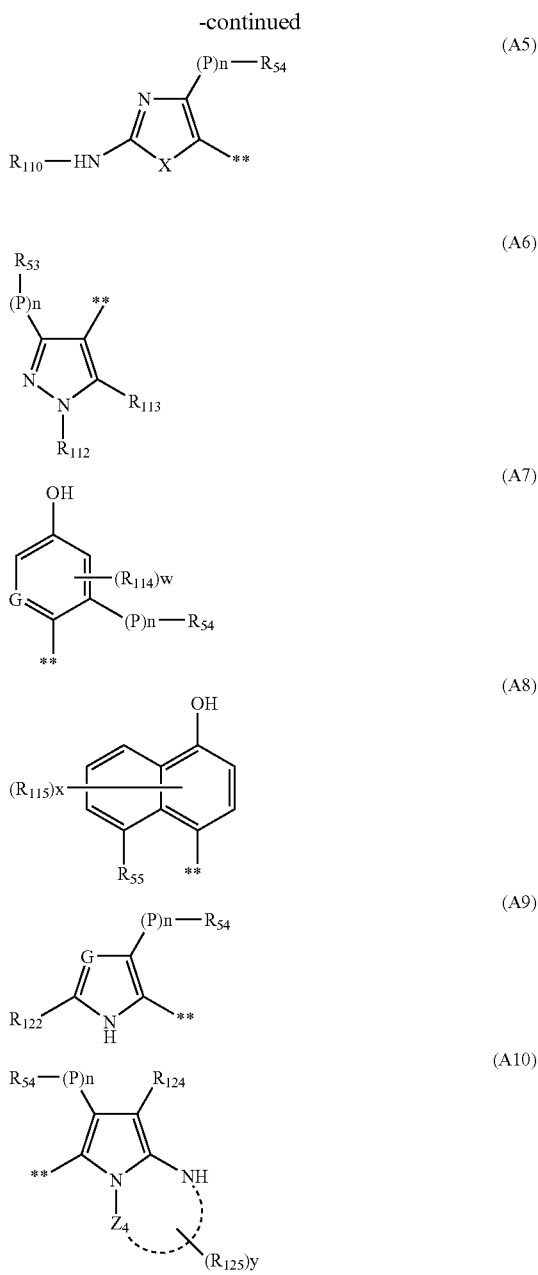

wherein, ** represents a site which is bound to the azo group in the formula (I), wherein, in the formula (A1), $R_{102}$ represents a cyano group, a carbamoyl group, an alkylsulfonyl group, an arylsulfonyl group, an acyl group, an alkoxycarbonyl group, or an aryloxycarbonyl group, Q represents an atomic group required for forming a ring, represents an atomic group composed of carbon atoms which form a benzene ring, naphthalene ring, or the like when the ring is an aromatic ring, and represents an atomic group having at least one hetero atom and composed of carbon atoms and/or hetero atoms when it is a hetero ring, P represents an oxygen atom, sulfur atom, —C($R^1$)$_2$— or —N($R^2$)— ($R^1$ and $R^2$ each represent a hydrogen atom, a substituted or unsubstituted alkyl group having 1 to 10 carbon atoms, or a substituted or unsubstituted aryl group having 6 to 10 carbon atoms (preferably phenyl group)), n represents an integer of 0 to 2, and $R_{51}$ represents a halogen atom, or a cyano group, an alkoxycarbonyl group, an aryloxycarbonyl group, a heterocyclic oxycarbonyl group, a carbamoyl group, or an acyl group, wherein, in the formula (A2), $R_{105}$ and $R_{106}$ each independently represent a hydrogen atom, or an alkyl, aryl, or heterocyclic group, $R_{52}$ represents a cyano group, an alkoxycarbonyl group, an aryloxycarbonyl group, a heterocyclic oxycarbonyl group, a carbamoyl group, or an acyl group, and Q is the same as that defined above, wherein, in the formula (A3), Q, $R_{102}$ and $R_{52}$ are the same as those defined above, wherein, in the formula (A4), $Z_2$ and $Z_3$ each independently represent —C($R_{108}$)= or —N=, $R_{108}$ represents an alkyl group, an aryl group, a heterocyclic group, an alkylthio group, an arylthio group, an alkoxycarbonyl group, or a carbamoyl group, P and n are the same as those defined above, $R_{53}$ represents a cyano group, an alkoxycarbonyl group, an aryloxycarbonyl group, a heterocyclic oxycarbonyl group, or a carbamoyl group, or a group represented by formula (II), and n is 0 when $R_{53}$ is represented by the formula (II):

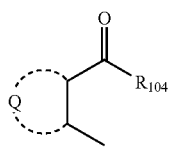

formula (II)

wherein, Q is the same as that defined above, and $R_{104}$ represents a substituted or unsubstituted alkyl group, a substituted or unsubstituted aryl group, an alkoxy group, an aryloxy group, a heterocyclic oxy group, or a perfluoroalkyl group, wherein, in the formula (A5), P and n are the same as those defined above, $R_{110}$ represents an alkyl, aryl, heterocyclic, acyl, cyano, $(R_{130}O)_2P(O)$— ($R_{130}$ denotes a hydrogen atom, a substituted or unsubstituted alkyl group having 1 to 10 carbon atoms, or a substituted or unsubstituted aryl group having 6 to 10 carbon atoms), an alkylsulfonyl group, or an arylsulfonyl group, X represents a sulfur or oxygen atom, and $R_{54}$ represents a cyano group, an alkoxycarbonyl group, an aryloxycarbonyl group, a heterocyclic oxycarbonyl group, a carbamoyl group, or an acyl group, or a group represented by the formula (II), and n is 0 when $R_{54}$ is represented by the formula (II), wherein, in the formula (A6), $R_{112}$ represents a hydrogen atom, or an alkyl group, an aryl group, or a heterocyclic group, $R_{113}$ represents a hydroxyl group or an amino group, and n, P, and $R_{53}$ are the same as those defined above, wherein, in the formula (A7), G represents substituted or unsubstituted methine, or a nitrogen atom, $R_{114}$ represents a halogen atom, or an alkyl group, an aryl group, a heterocyclic group, a nitro group, a carboxyl group, an alkoxy group, an aryloxy group, an amino group (including an anilino group), an acylamino group, an alkoxycarbonyl amino group, an aminocarbonyl amino group, an alkylsulfonyl amino group, an arylsulfonyl amino group, an alkylthio group, an arylthio group, a heterocyclic thio group, a cyano group, an alkoxycarbonyl group, or a carbamoyl group, w represents an integer of 1 to 3, and n, P, and $R_{54}$ are the same as those defined above, wherein, in the formula (A8), $R_{115}$ represents a halogen atom, or an aryl group, a heterocyclic group, a nitro group, a carboxyl group, an alkoxy group, an aryloxy group, an amino group (including an anilino group), an acylamino group, an alkoxycarbonyl amino group, an aminocarbonyl amino group, an alkylsulfonyl amino group, an arylsulfonyl amino group, an alkylthio group, an arylthio group, a heterocyclic thio group, an alkoxycarbonyl group, a carbamoyl group, a sulfamoyl group, or a sulfo group, x represents an integer of 0 to 5, and $R_{55}$ represents an alkoxycarbonyl group, an aryloxycarbonyl group, a cyano group, an acylamino group, an alkoxycarbonyl amino group, an aminocarbonyl amino group, an acyl group, or an aryloxycarbonyl amino group, wherein, in the formula (A9), $R_{122}$ represents a hydrogen atom, or an alkyl group, an aryl group, a heterocyclic group, an acylamino group, an alkylsulfonyl amino group, or an arylsulfonyl amino group, G represents substituted or non-substituted methine, or a nitrogen atom, and n, P, and $R_{54}$ are the same as those defined for the above, and wherein, in the formula (A10), $R_{124}$ represents an alkyl group, an aryl group, a heterocyclic group, a cyano group, an alkylsulfonyl group, a sulfamoyl group, an arylsulfonyl group, an alkoxycarbonyl group, or a carbamoyl group, $Z_4$ represents a non-metal atomic group forming a 5- or 6-membered ring with two nitrogen atoms and one carbon atom, $R_{125}$ represents an alkyl group, an aryl group, an alkoxy group, an amino group, an acylamino group, an alkylsulfonyl amino group, an arylsulfonyl amino group, an alkylthio group, an arylthio group, an acyl group, an alkoxycarbonyl group, or a carbamoyl group, y represents an integer of 0 to 2 when $Z_4$ forms a 5-membered ring, and an integer of 0 to 3 when $Z_4$ forms a 6-membered ring, and n, P, and $R_{54}$ are the same as those defined above.

(5) The azo dye represented by formula (I) described in item (1), wherein the B is represented by any one of formulae (B1) to (B25):

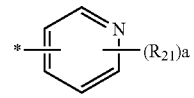

(B1)

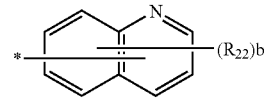

(B2)

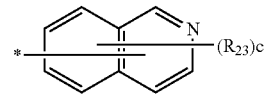

(B3)

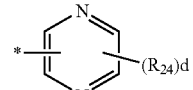

(B4)

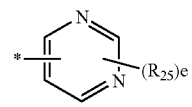

(B5)

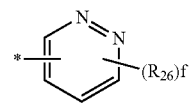

(B6)

-continued

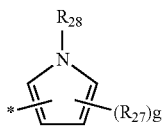
(B7)

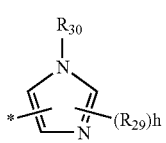
(B8)

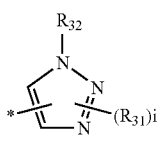
(B9)

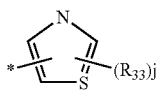
(B10)

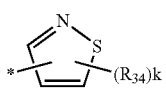
(B11)

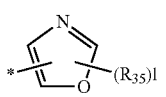
(B12)

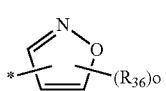
(B13)

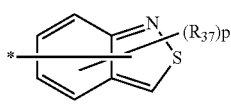
(B14)

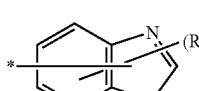
(B15)

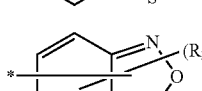
(B16)

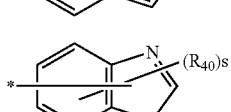
(B17)

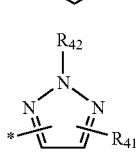
(B18)

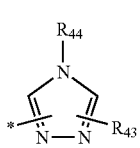
(B19)

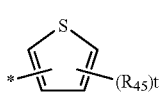
(B20)

-continued (B21)

(B22)

(B23)

(B24)

(B25)

wherein, the mark "*" indicates the position at which the group bonds to the azo group in the compound represented by formula (I), $R_{21}$ to $R_{50}$ each independently represent a halogen atom, an alkyl group (including a cycloalkyl group), an alkenyl group (including a cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkyl thio group, an aryl thio group, a heterocyclic thio group, a sulfamoyl group, a sulfo group, an alkyl sulfinyl group, an aryl sulfinyl group, an alkyl sulfonyl group, an aryl sulfonyl group, an acyl group, an alkoxycarbonyl group, an aryloxycarbonyl group, a carbamoyl group, an aryl azo group, a heterocyclic azo group, an imide group, a phosphino group, a phosphinyl group, a phosphinyloxy group, a phosphinylamino group, and a silyl group, a, p, q, r, and s each represent an integer of 0 to 4, b and c each represent an integer of 0 to 6, d, e, f, g, t, and u each represent an integer of 0 to 3, h, j, k, l, and o each represent an integer. of 0 to 2, and i is 0 or 1.

(6) The azo dye represented by formula (I) described in item (1), wherein the A has an acylamino group.

(7) The azo dye represented by formula (I) described in item (1), wherein the B is derived from a diazo component.

(8) A dye composition comprising the azo dye represented by formula (I) described in item (1).

Hereinafter, the present invention is described in detail.

The inventors of the present invention have focused on highly nucleophilic hydrazino group or amino group produced when the azo dye is reductively decomposed, found that it is possible to convert the compound having the group to a substantially stable compound by inducing an intramolecular nucleophilic substitution reaction, and completed the present invention on the basis of this finding.

An azo dye (A) is reductively decomposed to an amino form (C) in nature (in vivo). In this process, there is a possibility that a hydrazine form (B) is produced. Examples of this reaction are shown in the following scheme (II).

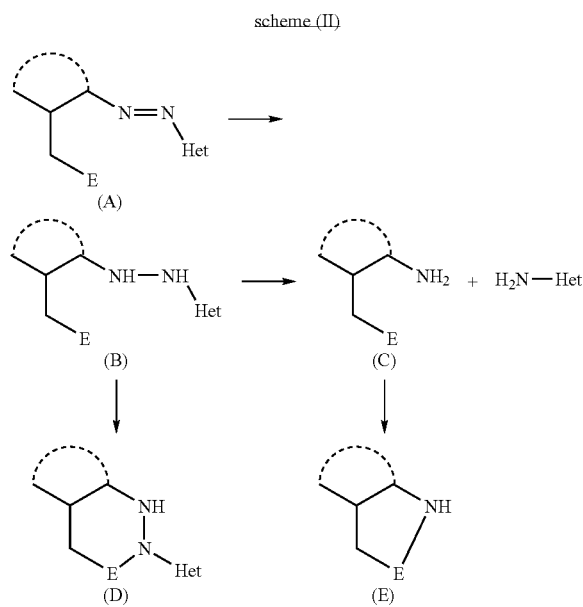

scheme (II)

In the above scheme (II), E represents an electrophilic site, and Het represents a hetero ring which is bound to the azo group at a carbon atom.

In the cyclization reaction, there are a case where a ring is closed at the hydrazine form in the above (B) and a case where the ring is closed at the amino form in (C). As shown in the scheme I, the compound is designed to cyclize at the hydrazine form (B) and/or the amino form (C).

In the formula (I), A represents a coupler component having a substituent required for inducing an intramolecular nucleophilic substitution reaction with a nitrogen atom of the reduced azo group as nucleophilic species when the azo group is reductively decomposed.

In the formula (I), it is preferred that A, which serves as the substituent required for inducing the intramolecular nucleophilic substitution reaction with the nitrogen atom of the reduced azo group as the nucleophilic species, have a halogen atom, a cyano group, an alkoxycarbonyl group, an aryloxycarbonyl group, a heterocyclic oxycarbonyl group, a carbamoyl group, an acyl group, an acylamino group, an alkoxycarbonylamino group, an aminocarbonylamino group, or an aryloxycarbonylamino group, or a group represented by the formula (II). Preferable carbon numbers and specific examples of the individual groups cited here are the same as those defined for descriptions of $R_{51}$ to $R_{55}$ or substituents of the heterocyclic group for B as described later.

It is preferred that a formation reaction of a cyclized form of the compound represented by the formula (I) according to the above scheme I be carried forward under conditions including a temperature of 15 to 50° C., a reaction time within several hours, and pH of 6 to 8. In the cyclized compound formed here, the aromatic amino group which is described as problematic in safety disappears, and thus following reactions hardly occur and the safety is enhanced.

The term "coupler component" refers to a partial structure derived from a coupler compound which gives an azo dye by reacting with a diazonium salt, and is established in the field of azo dyes.

Those known in the field of silver halide color photograph photosensitive materials are preferable as the coupler component, and it is possible to use a skeleton moiety (moiety which couples with an aromatic amine type developing agent oxidant such as p-phenylenediamine to become a chromophore of pigment) of the couplers for silver halide color photographs described in detail in pages 80 to 85 and 87 to 89 of Research Disclosure 37038 (February, 1995).

Examples of the coupler for forming a yellow dye image, which is known in the field of silver halide color photographic light-sensitive materials, include pivaloylacetamide-type couplers, benzoylacetamide-type couplers, malonic diester-type couplers, malonic diamide-type couplers, dibenzoylmethane-type couplers, benzothiazolylacetamide-type couplers, malonic ester monoamide-type couplers, benzoxazolylacetamide-type couplers, benzimidazolylacetamide-type couplers, cyanoacetoamide-type couplers, cycloalkylcarbonylacetamide-type couplers, indoline-2-ylacetamide-type couplers, quinazoline-4-one-2-ylacetamide-type couplers described in U.S. Pat. No. 5,021,332, benzo-1,2,4-thiadiazine-1,1-dioxide-3-ylacetamide-type couplers described in U.S. Pat. No. 5,021,330, couplers described in EP 421221A, couplers described in U.S. Pat. No. 5,455,149, couplers described in EP 0622673A, and 3-indoloylacetamide-type couplers described in EP 0953871A, 0953872A, and 0953873A.

Examples of the coupler for forming a magenta dye image, which is known in the field of silver halide color photographic light-sensitive materials, include 5-pyrazolone-type couplers, 1H-pyrazolo[1,5-a]benzimidazole-type couplers, 1H-pyrazolo[5,1-c][1,2,4]triazole-type couplers, 1H-pyrazolo[1,5-b][1,2,4]triazole-type couplers, 1H-imidazo[1,2-b]pyrazole-type couplers, cyanoacetophenone-type couplers, active propene-type couplers described in WO93/01523, enamine-type couplers described in WO93/075342, 1H-imidazo[1,2-b][1,2,4]triazole-type couplers, and couplers described in U.S. Pat. No. 4,871,652.

Examples of the coupler for forming a cyan dye image, which is known in the field of silver halide color photographic light-sensitive materials, include phenyl-type couplers, naphthol-type couplers, 2,5-diphenylimidazole-type couplers described in EP 0249453A, 1H-pyrrolo[1,2-b][1,2,4]triazole-type couplers, 1H-pyrrolo[2,1-c][1,2,4]triazole-type couplers, pyrrole-type couples described in JP-A-4-188137 and JP-A-4-190347, 3-hydroxypyridine-type couples described in JP-A-1-315736, pyrrolopyrazole-type couplers described in U.S. Pat. No. 5,164,289, pyrroloimidazole-type couplers described in JP-A-4-174429, pyrazolopyrimidine-type couplers described in U.S. Pat. No. 4,950,585, pyrrolotriazine-type couplers described in JP-A-4-204730, couplers described in U.S. Pat. No. 4,746,602, couplers described in U.S. Pat. No. 5,104,783, couplers described in U.S. Pat. No. 5,162,196, and couplers described in European Patent No. 0556700.

Those represented by the above formulae (A1) to (A10) are used as the coupler components. In the formulae (A1) to (A10), ** represents a site which is bound to the azo group in the formula (I).

In the formula (A1), $R_{102}$ represents a cyano group, a carbamoyl group, an alkylsulfonyl group, an arylsulfonyl group, an acyl group, an alkoxycarbonyl group, or an aryloxycarbonyl group, Q represents an atomic group required for forming a ring, represents an atomic group composed of carbon atoms which form a benzene ring, naphthalene ring, or the like when the ring is an aromatic ring, and represents an atomic group having at least one hetero atom and composed of carbon atoms and/or hetero atoms when it is a hetero ring. Sulfur, nitrogen, and oxygen are preferable as the hetero atoms, and a ring member number is preferably 5 or 6. When Q has a hetero atom in the hetero ring, Q may be further condensed with another ring, and in condensed rings, a condensed ring with a 5- or 6-membered ring is preferable. $R_{102}$ is preferably a cyano group or a carbamoyl group, and more preferably a cyano group. P represents an oxygen atom, sulfur atom, —C($R^1$)$_2$— or —N($R^2$)— ($R^1$ and $R^2$ each represent a hydrogen atom, a substituted or unsubstituted alkyl group having 1 to 10 carbon atoms, or a substituted or unsubstituted aryl group having 6 to 10 carbon atoms (preferably phenyl group)). n represents an integer of 0 to 2. $R_{51}$ represents a halogen atom, or a cyano group, an alkoxycarbonyl group, an aryloxycarbonyl group, a heterocyclic oxycarbonyl group (heterocyclic oxycarbonyl group having 2 to 10 carbon atoms, e.g., 1-methylpyrazol-5-yloxycarbonyl, pyridin-4-yloxycarbonyl), a carbamoyl group, or an acyl group. The formula (A1) represents preferably formula (A1a) or (A1b).

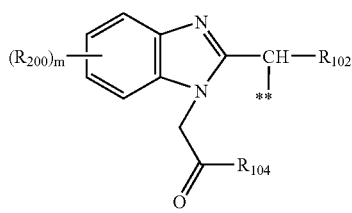
(A1a)

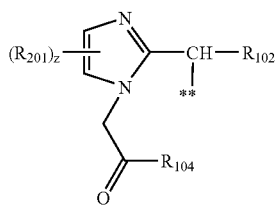
(A1b)

In the formulae (A1a) and (A1b), $R_{102}$ is the same as that defined above. $R_{104}$ represents a substituted or unsubstituted alkyl group, a substituted or unsubstituted aryl group, or an alkoxy group, an aryloxy group, a heterocyclic oxy group, or a perfluoroalkyl group (perfluoroalkyl group having 1 to 10 carbon atoms, e.g., trifluoromethyl, heptafluoropropyl), $R_{200}$ represents a substitute capable of being substituted to a benzene ring, m represents an integer of 0 to 4, and z represents an integer of 0 to 2. In the formula (A1b), $R_{201}$ represents a substituent capable of being substituted to an imidazole ring, and preferably represents a cyano group, an alkoxycarbonyl group, or an aryloxycarbonyl group.

In the formula (A2), Q is the same as that defined above. $R_{105}$ and $R_{106}$ each independently represent a hydrogen atom, or an alkyl, aryl, or heterocyclic group. It is preferred that one of $R_{105}$ and $R_{106}$ be a hydrogen atom or both be hydrogen atoms. $R_{52}$ represents a cyano group, an alkoxycarbonyl group, an aryloxycarbonyl group, a heterocyclic oxycarbonyl group (heterocyclic oxycarbonyl group having 2 to 10 carbon atoms, e.g., 1-methylpyrazol-5-yloxycarbonyl, pyridin-4-yloxycarbonyl), a carbamoyl group, or an acyl group. The formula (A2) represents preferably formula (A2a) or (A2b).

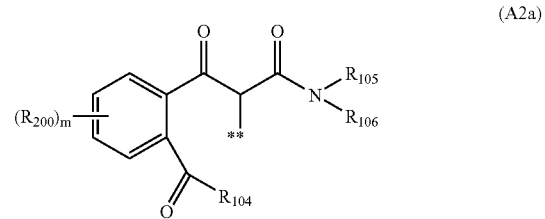
(A2a)

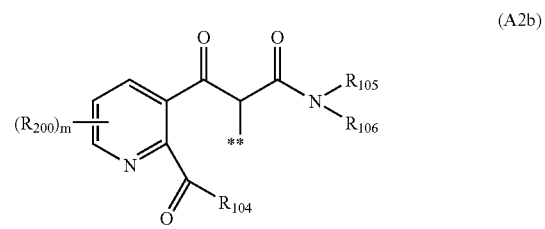
(A2b)

In the formulae (A2a) and (A2b), $R_{200}$, $R_{104}$, $R_{105}$, $R_{106}$ and m are the same as those defined in the formulae (A1a) and (A1b).

In the formula (A3), Q, $R_{102}$ and $R_{52}$ are the same as those defined in the formulae (A2). The formula (A3) represents preferably formula (A3a) or (A3b). In the formulae (A3a) and (A3b), $R_{200}$, $R_{102}$, $R_{104}$ and m are the same as above.

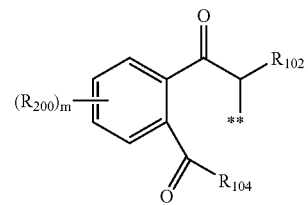
(A3a)

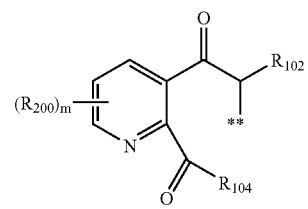
(A3b)

In the formula (A4), $Z_2$ and $Z_3$ each independently represent —C($R_{108}$)═ or —N═, and $R_{108}$ represents an alkyl group, an aryl group, a heterocyclic group, an alkylthio group, an arylthio group, an alkoxycarbonyl group, or a carbamoyl group. When each of $Z_2$ and $Z_3$ represents —C($R_{108}$)═, two $R_{108}$'s may be identical to or different from each other, and may be bound to each other to form a carbon ring or hetero ring. n and P are the same as those defined for n and P in the formula (A1). $R_{53}$ represents a cyano group, an alkoxycarbonyl group, an aryloxycarbonyl group, a heterocyclic oxycarbonyl group, or a carbamoyl group, or a group represented by formula (II). However, when $R_{53}$ is represented by the formula (II), n is 0.

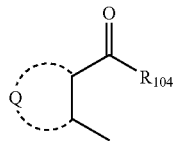

formula (II)

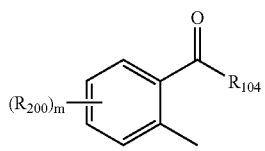

formula (III)

In the formula (II), Q and $R_{104}$ are the same as those defined above. Compounds represented by the formula (II) are preferably represented by the formula (III). The substituents $R_{104}$, $R_{200}$, and m in the formula (III) are the same as those defined above.

In the formula (A5), P and n are the same as those defined above. $R_{110}$ represents an alkyl, aryl, heterocyclic, acyl, cyano, $(R_{130}O)_2P(O)-$ ($R_{130}$ denotes a hydrogen atom, a substituted or unsubstituted alkyl group having 1 to 10 carbon atoms, or a substituted or unsubstituted aryl group having 6 to 10 carbon atoms), an alkylsulfonyl group, or an arylsulfonyl group. X represents a sulfur or oxygen atom. Preferable X is a sulfur atom. $R_{54}$ represents a cyano group, an alkoxycarbonyl group, an aryloxycarbonyl group, a heterocyclic oxycarbonyl group, a carbamoyl group, or an acyl group, or a group represented by the formula (II). However, when $R_{54}$ is represented by the formula (II), n is 0.

In the formula (A6), $R_{112}$ represents a hydrogen atom, or an alkyl group, an aryl group, or a heterocyclic group, and $R_{113}$ represents a hydroxyl group or an amino group. $R_{112}$ is preferably an alkyl group or an aryl group. n, P, and $R_{53}$ are the same as those defined above.

In the formula (A7), G represents substituted or unsubstituted methine, or a nitrogen atom. Preferred examples of a substituent include a cyano group, an alkylsulfonyl group, an arylsulfonyl group, an acyl group, an alkoxycarbonyl group, an aryloxycarbonyl group, and a carbamoyl group. $R_{114}$ represents a halogen atom, or an alkyl group, an aryl group, a heterocyclic group, a nitro group, a carboxyl group, an alkoxy group, an aryloxy group, an amino group (including an anilino group), an acylamino group, an alkoxycarbonyl amino group, an aminocarbonyl amino group, an alkylsulfonyl amino group, an arylsulfonyl amino group, an alkylthio group, an arylthio group, a heterocyclic thio group, a cyano group, an alkoxycarbonyl group, or a carbamoyl group. w represents an integer of 1 to 3. w $R_{114}$'s may be identical to or different from each other when w is plural. Preferable $R_{114}$ include a halogen atoms, a cyano group, an alkyl group, an acylamino group, an alkoxycarbonyl amino group, an aminocarbonyl amino group, an alkylsulfonyl amino group, an arylsulfonyl amino group, and a carbamoyl group. n, P, and $R_{54}$ are the same as those defined above.

In the formula (A8), $R_{115}$ represents a halogen atom, or an aryl group, a heterocyclic group, a nitro group, a carboxyl group, an alkoxy group, an aryloxy group, an amino group (including an anilino group), an acylamino group, an alkoxycarbonyl amino group, an aminocarbonyl amino group, an alkylsulfonyl amino group, an arylsulfonyl amino group, an alkylthio group, an arylthio group, a heterocyclic thiol group, an alkoxycarbonyl group, a carbamoyl group, a sulfamoyl group, or a sulfo group. x represents an integer of 0 to 5. x $R_{115}$'s may be identical to or different from each other when x is plural. Preferable $R_{115}$ include a halogen atom, a carboxyl group, an acylamino group, an alkoxycarbonyl amino group, an aminocarbonyl amino group, an alkylsulfonyl amino group, an arylsulfonyl amino group, a sulfamoyl group, and a carbamoyl group. Examples of a substituent at position 2 include a sulfonamide group and a carbonamide group when $R_{115}$ is substituted at position 2 in x=1. $R_{55}$ represents an alkoxycarbonyl group, an aryloxycarbonyl group, a cyano group, an acylamino group, an alkoxycarbonyl amino group, an aminocarbonyl amino group, an acyl group, or an aryloxycarbonyl amino group.

In the formula (A9), $R_{122}$ represents a hydrogen atom, or an alkyl group, an aryl group, a heterocyclic group, an acylamino group, an alkylsulfonyl amino group, or an arylsulfonyl amino group. G represents substituted or non-substituted methine, or a nitrogen atom. Preferred examples of a substituent include a cyano group, an alkylsulfonyl group, an arylsulfonyl group, an acyl group, an alkoxycarbonyl group, an aryloxycarbonyl group, and a carbamoyl group. n, P, and $R_{54}$ are the same as those defined for the above n, P, and $R_{54}$.

In the formula (A10), $R_{124}$ represents an alkyl group, an aryl group, a heterocyclic group, a cyano group, an alkylsulfonyl group, a sulfamoyl group, an arylsulfonyl group, an alkoxycarbonyl group, or a carbamoyl group. $Z_4$ represents a non-metal atomic group forming a 5- or 6-membered ring with two nitrogen atoms and one carbon atom. $R_{125}$ represents an alkyl group, an aryl group, an alkoxy group, an amino group, an acylamino group, an alkylsulfonyl amino group, an arylsulfonyl amino group, an alkylthio group, an arylthio group, an acyl group, an alkoxycarbonyl group, or a carbamoyl group. y represents an integer of 0 to 2 when $Z_4$ forms a 5-membered ring, and an integer of 0 to 3 when $Z_4$ forms a 6-membered ring. Preferable $R_{124}$ include an alkylsulfonyl group, an arylsulfonyl group, a sulfamoyl group, an alkoxycarbonyl group, and a carbamoyl group. Preferable $R_{125}$ include an alkyl group, an aryl group, an alkylthio group, an amino group, and an acylamino group. n, P, and $R_{54}$ are the same as those defined above.

Preferable carbon numbers and specific examples of the individual groups included in the descriptions of the groups represented by $R_{101}$ to $R_{125}$, $R_{51}$ to $R_{55}$, and $R_{200}$ and $R_{201}$ in the formulae (A1) to (A10), (A2a), (A2b), (A3a), (A3b), and the formulae (II) and (III) are the same as those included in the descriptions of the heterocyclic group described in next B, except for the groups shown above.

In the formula (I), B represents an aromatic ring or a hetero ring which is bound to the azo group at a carbon atom, and is preferably a hetero ring.

A monovalent heterocyclic group represented by the above B is preferably a 5- or 6-membered hetero ring having at least one hetero atom selected from oxygen, sulfur, and nitrogen atoms in the ring. An aromatic hetero ring is more preferable. The monovalent heterocyclic group represented by the above B may be further codensed with another ring, and in condensed rings, one condensed with a 5- or 6-membered ring is preferable. The carbon number of a hetero ring including substituents on the hetero ring is preferably from 2 to 20, and more preferably from 2 to 10.

Preferable examples of the monovalent heterocyclic group represented by the above B include those derived from diazo components.

Here, the term "diazo component" refers to a partial structure that can be introduced by diazo-coupling with the coupler by converting a hetero ring compound having an amino group as a substituent to a diazo compound, and is a concept commonly used in the field of azo dyes.

In other words, in the heterocyclic compound subjected to amino substitution capable of diazotization, the diazo component is a substituent from which an amino group is removed to make a monovalent group.

In formula (I), the heterocyclic group represented by B may have a substituent. Examples of the substituent include a halogen atom, an alkyl group (including a cycloalkyl group), an alkenyl group (including a cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkyl thio group, an aryl thio group, a heterocyclic thio group, a sulfamoyl group, a sulfo group, an alkyl sulfinyl group, an aryl sulfinyl group, an alkyl sulfonyl group, an aryl sulfonyl group, an acyl group, an alkoxycarbonyl group, an aryloxycarbonyl group, a carbamoyl group, an aryl azo group, a heterocyclic azo group, an imide group, a phosphino group, a phosphinyl group, a phosphinyloxy group, a phosphinylamino group, and a silyl group.

For more detail, examples of the substituent include a halogen atom (e.g., a fluorine atom, a chlorine atom, a bromine atom, an iodine atom); an alkyl group (a straight- or branched-chain or cyclic alkyl group having 1 to 10 carbon atoms, preferably having 1 to 6 carbon atoms, e.g., methyl, ethyl, n-propyl, isopropyl, t-butyl, n-octyl, 2-chloroethyl, 2-cyanoethyl, 2-ethylhexyl, cyclopropyl, and cyclopentyl); an alkenyl group (a straight- or branched-chain or cyclic alkenyl group having 2 to 10 carbon atoms, preferably having 2 to 6 carbon atoms, e.g., vinyl, allyl, prenyl, cyclopentene-1-yl); an alkynyl group (a alkynyl group having 2 to 10 carbon atoms, preferably having 2 to 6 carbon atoms, e.g., ethynyl, propargyl); an aryl group (an aryl group having 6 to 12 carbon atoms, preferably having 6 to 8 carbon atoms, e.g., phenyl, p-tolyl, naphthyl, 3-chlorophenyl, 2-aminophenyl); a heterocyclic group (a monovalent group having 1 to 12 carbon atoms, preferably 2 to 6 carbon atoms, which is obtained by removing one hydrogen atom from an aromatic or non-aromatic heterocyclic compound, more preferably from a 5-membered or 6-membered heterocyclic group; e.g., 1-pyrazolyl, 1-imidazolyl, 2-furyl, 2-thienyl, 4-pyrimidinyl, 2-benzothiazolyl); a cyano group; a hydroxyl group; a nitro group; a carboxyl group;

an alkoxy group (a straight- or branched-chain or cyclic alkoxy group having 1 to 10 carbon atoms, preferably having 1 to 6 carbon atoms, e.g., methoxy, ethoxy, isopropoxy, t-butoxy, cyclopentyloxy, 2-butene-1-yl oxy, 2-methoxyethoxy); an aryloxy group (an aryloxy group having 6 to 12 carbon atoms, preferably 6 to 8 carbon atoms, e.g., phenoxy, 2-methylphenoxy, 4-t-butylphenoxy, 3-nitrophenoxy); a silyloxy group (a silyloxy group having 3 to 10 carbon atoms, preferably 3 to 6 carbon atoms, e.g., trimethylsilyloxy, t-butyldimethylsilyloxy); a heterocyclic oxy group (a heterocyclic oxy group having 1 to 12 carbon atoms, preferably having 2 to 6 carbon atoms, e.g., 1-phenyltetrazole-5-oxy, 2-tetrahydropyranyloxy); an acyloxy group (an acyloxy group having 1 to 12 carbon atoms, preferably having 1 to 8 carbon atoms, e.g., formyloxy, acetyloxy, pivaloyloxy, benzoyloxy, p-methoxyphenylcarbonyloxy); a carbamoyloxy group (a carbamoyloxy group having 1 to 10 carbon atoms, preferably having 1 to 6 carbon atoms, e.g., N,N-dimethylcarbamoyloxy, N,N-diethylcarbamoyloxy, morpholino carbonyloxy, N-n-octylcarbamoyloxy);

an alkoxycarbonyloxy group (an alkoxycarbonyloxy group having 2 to 10 carbon atoms, preferably 2 to 6 carbon atoms, e.g., methoxycarbonyloxy, ethoxycarbonyloxy, t-butoxy carbonyloxy, n-octyloxycarbonyloxy); an aryloxycarbonyloxy group (an aryloxycarbonyloxy group having 7 to 12 carbon atoms, preferably 7 to 10 carbon atoms, e.g., phenoxycarbonyloxy, p-methoxyphenoxycarbonyloxy); an amino group (an alkylamino group having 1 to 10 carbon atoms, preferably 1 to 6 carbon atoms, an anilino group having 6 to 12 carbon atoms, preferably having 6 to 8 carbon atoms, and a heterocyclic amino group having 1 to 12 carbon atoms, preferably 2 to 6 carbon atoms, e.g., amino, methylamino, dimethylamino, anilino, N-methyl-anilino, diphenylamino, imidazole-2-yl amino, pyrazole-3-yl amino), an acylamino group (an alkylcarbonylamino group having 1 to 10 carbon atoms, preferably 1 to 6 carbon atoms, an arylcarbonylamino group having 6 to 12 carbon atoms, preferably 6 to 8 carbon atoms, a heterocyclic carbonylamino group having 2 to 12 carbon atoms, preferably 2 to 6 carbon atoms, e.g., formylamino, acetylamino, pivaloylamino, benzoylamino, pyridine-4-carbonylamino, thiophene-2-carbonylamino); an aminocarbonylamino group (an aminocarbonylamino group having 1 to 12 carbon atoms, preferably 1 to 6 carbon atoms, e.g., carbamoylamino, N,N-dimethylaminocarbonylamino, N,N-diethylamino carbonylamino, morpholine-4-yl carbonylamino), an alkoxycarbonylamino group (an alkoxycarbonylamino group having 2 to 10 carbon atoms, preferably 2 to 6 carbon atoms, e.g., methoxycarbonylamino, ethoxycarbonylamino, t-butoxycarbonylamino); an aryloxycarbonylamino group (an aryloxycarbonylamino group having 7 to 12 carbon atoms, preferably 7 to 9 carbon atoms, e.g., phenoxycarbonylamino, p-chlorophenoxycarbonylamino, 4-methoxyphenoxycarbonylamino); a sulfamoyl amino group (a sulfamoylamino group having 0 to 10 carbon atoms, preferably 0 to 6 carbon atoms, e.g., sulfamoylamino, N,N-dimethylaminosulfonylamino, N-(2-hydroxyethyl)sulfamoylamino);

an alkylsulfonylamino group (an alkylsulfonylamino group having 1 to 10 carbon atoms, preferably 1 to 6 carbon atoms, e.g., methylsulfonylamino, butylsulfonylamino); an arylsulfonylamino group (an arylsulfonylamino group having 6 to 12 carbon atoms, preferably 6 to 8 carbon atoms, e.g., phenylsulfonylamino, 2,3,5-trichlorophenylsulfonylamino, p-methylphenylsulfonylamino); a mercapto group; an alkylthio group (an alkylthio group having 1 to 10 carbon atoms, preferably 1 to 6 carbon atoms, e.g., methylthio, ethylthio, butylthio), an arylthio group (an arylthio group having 6 to 12 carbon atoms, preferably 6 to 8 carbon atoms, e.g., phenylthio, p-chlorophenylthio, m-methoxyphenylthio); a heterocyclic thio group (a heterocyclic thio group having 1 to 10 carbon atoms, preferably 1 to 6 carbon atoms, e.g., 2-benzothiazolylthio, 1-phenyltetrazol-5-ylthio); a sulfamoyl group (a sulfamoyl group having 0 to 10 carbon atoms, preferably 0 to 6 carbon atoms, e.g., sulfamoyl, N-ethylsulfamoyl, N,N-dimethyl sulfamoyl, N-acetylsulfamoyl, N-benzoylsulfamoyl); a sulfo group;

an alkylsulfinyl group (an alkylsulfinyl group having 1 to 10 carbon atoms, preferably 1 to 6 carbon atoms, e.g., methyl sulfinyl, ethyl sulfinyl); an arylsulfinyl group (an arylsulfinyl group having 6 to 12 carbon atoms, preferably 6 to 8 carbon atoms, e.g., phenylsulfinyl, p-methylphenylsulfinyl); an alkylsulfonyl group (an alkylsulfonyl group having 1 to 10 carbon atoms, preferably 1 to 6 carbon atoms, e.g., methylsulfonyl, ethylsulfonyl); an arylsulfonyl group (an arylsulfonyl group having 6 to 12 carbon atoms, preferably 6 to 8 carbon atoms, e.g., phenylsulfonyl, p-chlorophenylsulfonyl); an acyl group (a formyl group, an alkylcarbonyl group having 2 to 10 carbon atoms (preferably 2 to 6 carbon atoms) and an arylcarbonyl group having 7 to 12 carbon atoms (preferably 7 to 9 carbon atom), e.g., acetyl, pivaloyl, 2-chloroacetyl, benzoyl, 2,4-dichlorobenzoyl); an alkoxycarbonyl group (an alkoxycarbonyl group having 2 to 10 carbon atoms, preferably 2 to 6 carbon atoms, e.g., methoxycarbonyl, ethoxycarbonyl, t-butoxycarbonyl, isobutyloxycarbonyl); an aryloxycarbonyl group (an aryloxycarbonyl group having 7 to 12 carbon atoms, preferably 7 to 9 carbon atoms, e.g., phenoxycarbonyl, 2-chlorophenoxycarbonyl, 3-nitrophenoxy carbonyl, 4-t-butylphenoxycarbonyl); a carbamoyl group (a carbamoyl group having 1 to 10 carbon atoms, preferably 1 to 6 carbon atoms, e.g., carbamoyl, N-methylcarbamoyl, N,N-dimethylcarbamoyl, N-(2-hydroxyethyl)carbamoyl, N-(methylsulfonyl)carbamoyl); an aryl azo group (an aryl azo group having 6 to 12 carbon atoms, preferably 6 to 8 carbon atoms, e.g., phenylazo, p-chlorophenylazo); a heterocyclic azo group (a heterocyclic azo group having 1 to 10 carbon atoms, preferably 1 to 6 carbon atoms, e.g., pyrazole-3-yl azo, thiazole-2-yl azo, 5-ethylthio-1,3,4-thiadiazole-2-yl azo); an imido group (an imido group having 2 to 10 carbon atoms, preferably 4 to 8 carbon atoms, e.g., N-succinimido, N-phthalimido); a phosphino group (a phosphino group having 2 to 12 carbon atoms, preferably 2 to 6 carbon atoms, e.g., dimethylphosphino, diphenylphosphino, methylphenoxyphosphino); a phosphinyl group (a phosphinyl group having 2 to 12 carbon atoms, preferably 2 to 6 carbon atoms, e.g., phosphinyl, diethoxyphosphinyl); a phosphinyloxy group (a phosphinyloxy group having 2 to 12 carbon atoms, preferably 2 to 6 carbon atoms, e.g., diphenoxyphosphinyloxy, dibutoxyphosphinyloxy); a phosphinylamino group (a phosphinylamino group having 2 to 12 carbon atoms, preferably 2 to 6 carbon atoms, e.g., dimethoxyphosphinylamino, dimethylamino phosphinylamino); and a silyl group (a silyl group having 3 to 12 carbon atoms, preferably 3 to 8 carbon atoms, e.g., trimethylsilyl, t-butyl dimethylsilyl, phenyldimethylsilyl). When the substituent is a group capable of being further substituted, it may further have a substituent. In this case, preferred examples of the substituent are the same substituents as described as the preferred substituent on the heterocyclic group represented by B. When the substituent is substituted with two or more substituents, these substituents may be the same or different.

Particularly preferred examples of the substituent of the heterocyclic group represented by B include a halogen atom, an alkyl group, an aryl group, a heterocyclic group, a cyano group, a hydroxyl group, a nitro group, a carboxyl group, an alkoxy group, an aryloxy group, an amino group (including an anilino group), an acylamino group, an aminocarbonylamino group, an alkoxycarbonylamino group, an alkylsulfonylamino group, an arylsulfonylamino group, an alkylthio group, an arylthio group, a heterocyclic thio group, a sulfamoyl group, a sulfo group, an alkyl sulfonyl group, an aryl sulfonyl group, an acyl group, an alkoxycarbonyl group, and a carbamoyl group. More preferred examples are a halogen atom, an alkyl group, a cyano group, a hydroxyl group, a nitro group, a carboxyl group, an alkoxy group, an amino group (including an anilino group), an acylamino group, an alkylsulfonylamino group, and a carbamoyl group.

In the aforementioned formula (I), the monovalent heterocyclic group that bonds to the azo group represented by B via a carbon atom may be represented by the aforementioned B1 to B25.

In the exemplified groups B1 to B25, the mark "*" indicates the position at which the group bonds to the azo group in formula (I). $R_{21}$ to $R_{50}$ each independently represent a substituent. The substituent is a group having the same meaning as those exemplified as the substituent on the heterocyclic group represented by formula B. Preferred examples include a halogen atom, an alkyl group, an aryl group, a heterocyclic group, a cyano group, a hydroxyl group, a nitro group, a carboxyl group, an alkoxy group, an aryloxy group, an amino group (including an anilino group), an acylamino group, an aminocarbonylamino group, an alkoxycarbonylamino group, an alkylsulfonylamino group, an arylsulfonylamino group, an alkyl thio group, an aryl thio group, a heterocyclic thio group, a sulfamoyl group, a sulfo group, an alkyl sulfonyl group, an aryl sulfonyl group, an acyl group, an alkoxycarbonyl group, and a carbamoyl group. More preferred are a halogen atom, an alkyl group, a cyano group, a hydroxyl group, a nitro group, a carboxyl group, an alkoxy group, an amino group (including an anilino group), an acylamino group, an alkylsulfonylamino group, and a carbamoyl group. a, p, q, r, and s each represent an integer of 0 to 4. b and c each represent an integer of 0 to 6. d, e, f, g, t, and u each represent an integer of 0 to 3. h, j, k, l, o each present an integer of 0 to 2. i is 0 or 1.

When a to h and j to u each are 2 or more, two or more groups represented by $R_{21}$ to $R_{50}$ may be identical to or different from each other.

Out of $R_{21}$ to $R_{50}$, adjacent ones may be bound to each other to form a ring structure. The formed ring structure may be a hetero ring or carbon ring, a saturated ring or unsaturated ring, and a ring member number is preferably 5 or 6.

When $R_{21}$ to $R_{50}$ in the formulae (B1) to B(25) are groups capable of being further substituted, $R_{21}$ to $R_{50}$ may further have substituents, and the substituents in that case are the same as those exemplified as the substituents of the heterocyclic group represented by the above B.

In the compounds represented by formula (I) according to the present invention, the heterocyclic group represented by formula B is preferably (B1), (B5), (B8), (B9), (B10), (B11), (B12), (B13), (B14), (B15), (B17), (B19), (B22), (B23), (B24), and (B25); and more preferably (B10), (B11), (B12), (B14), (B22), (B23), and (B25).

Specific examples of the azo dye represented by formula (I) according to the present invention are shown below. However, the present invention should not be construed as being limited to these compounds.

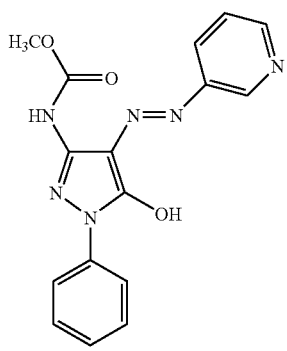
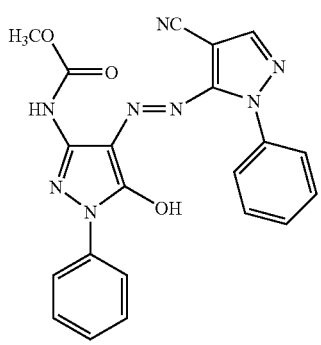
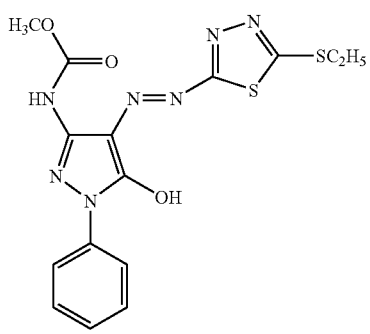
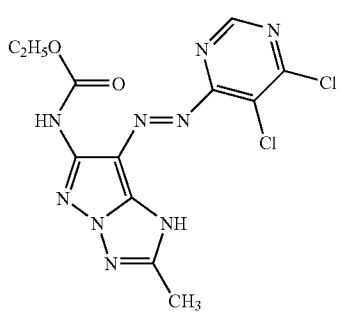
Y-1
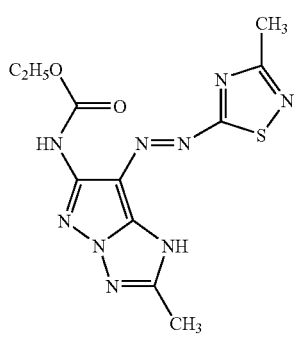
Y-2
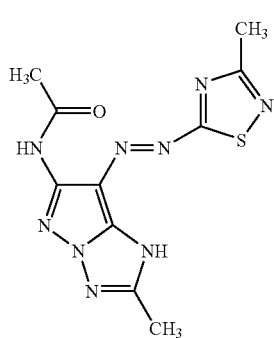
Y-3
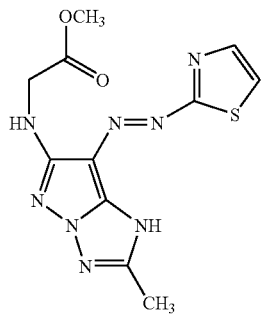
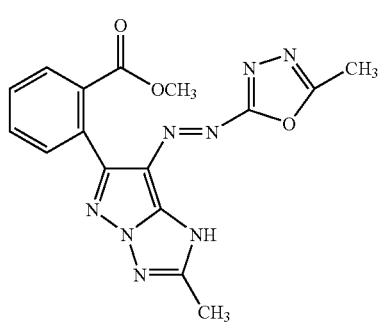
Y-4
Y-5
Y-6
Y-7
Y-8
Y-9
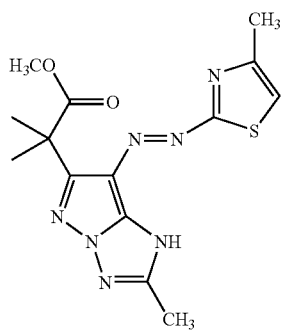

-continued
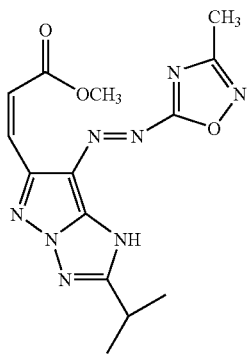 Y-10
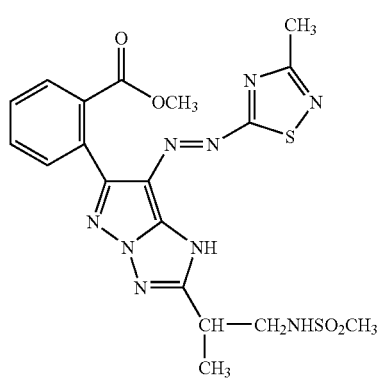 Y-11
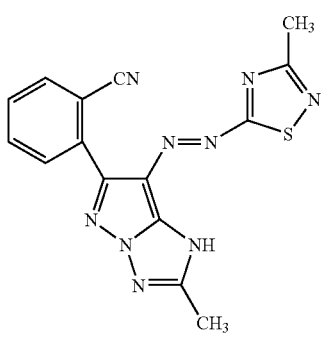 Y-12
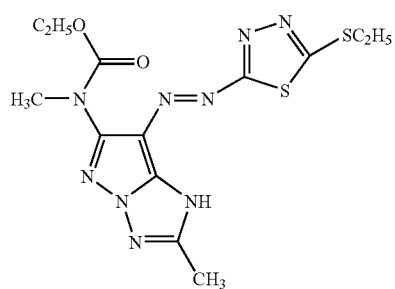 Y-13
-continued
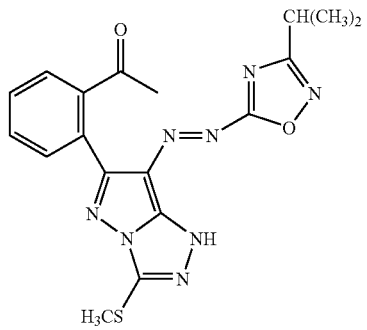 Y-14
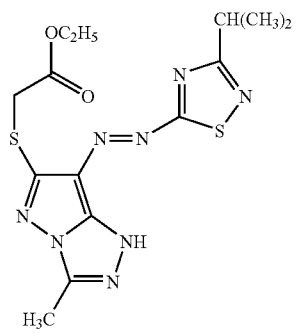 Y-15
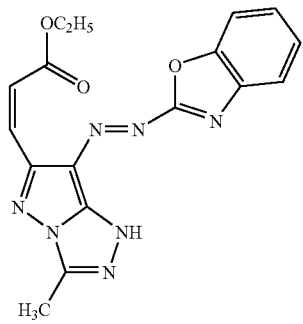 Y-16
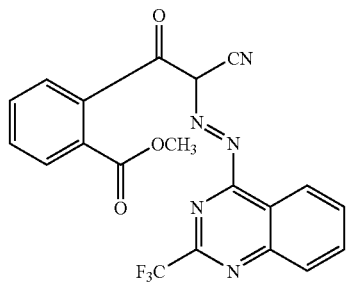 Y-17
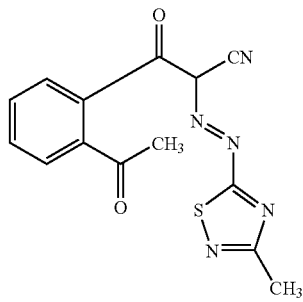 Y-18

-continued
Y-19
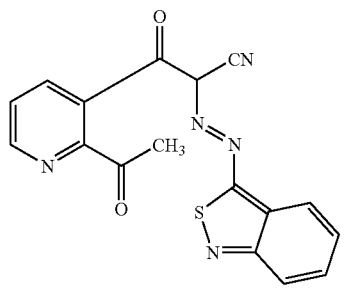
Y-20
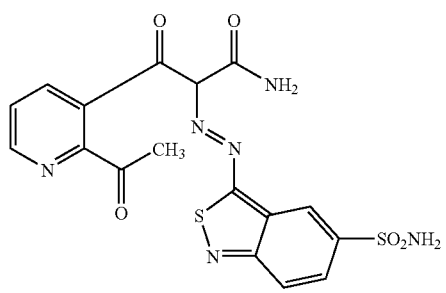
Y-21
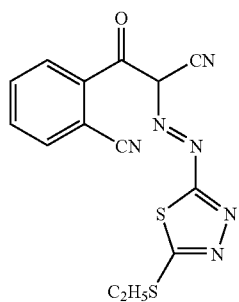
Y-22
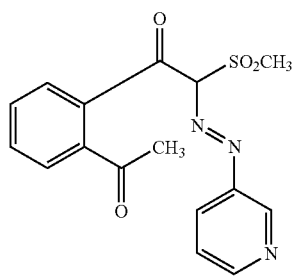
Y-23
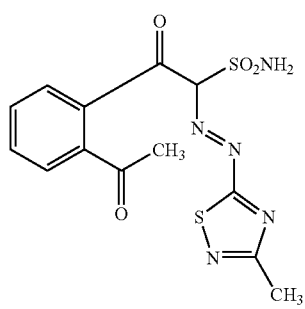
Y-24
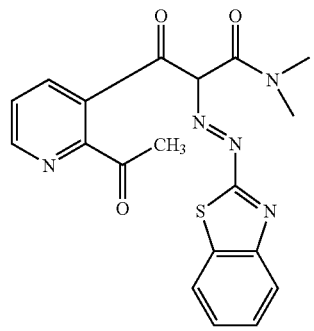
Y-25
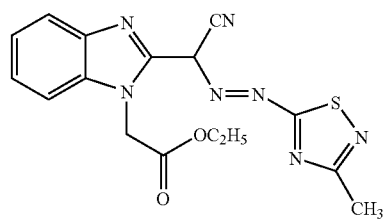
Y-26
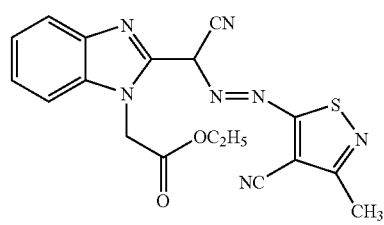
Y-27
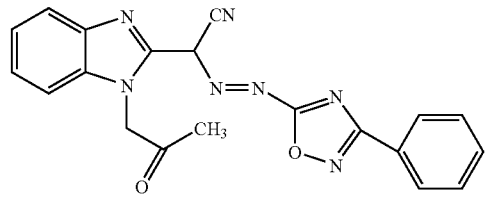
Y-28
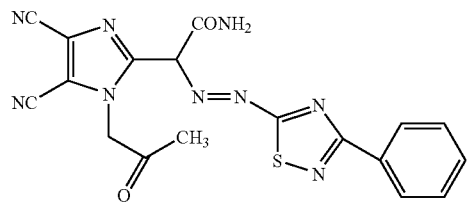
Y-29
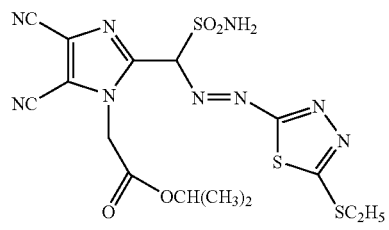

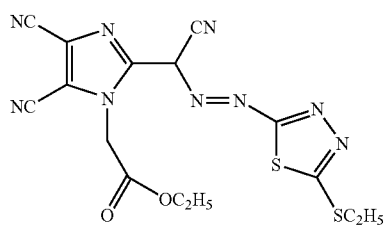 Y-30
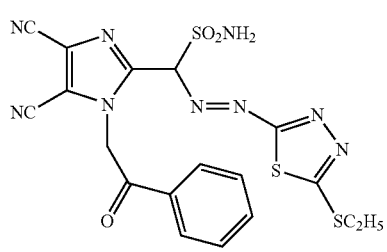 Y-31
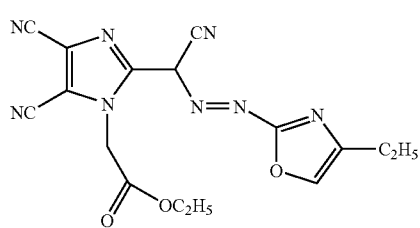 Y-32
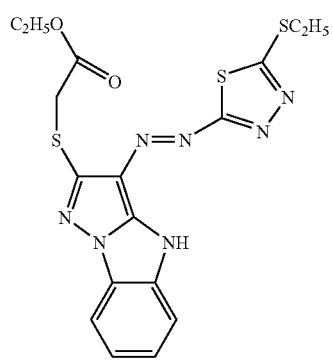 Y-33
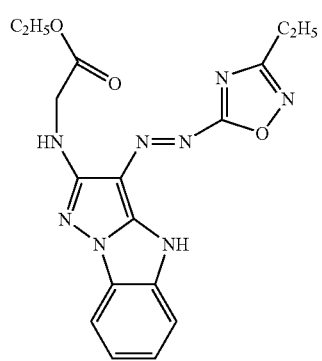 Y-34
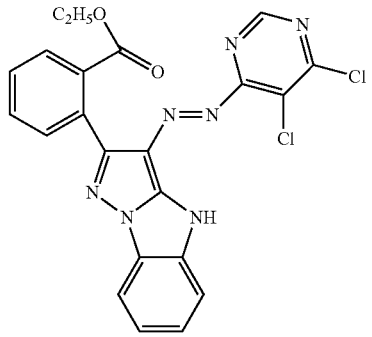 Y-35
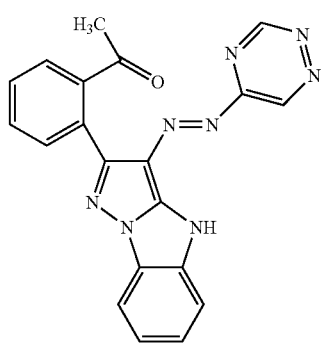 Y-36
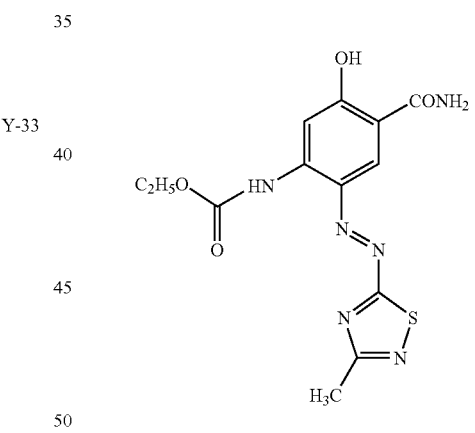 Y-37
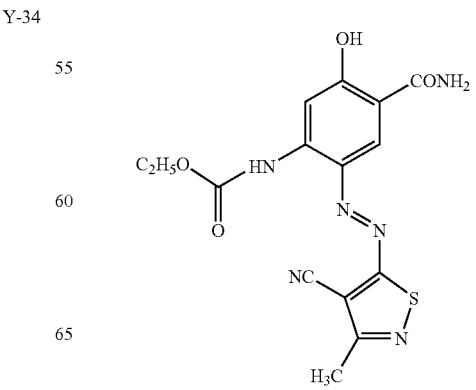 Y38
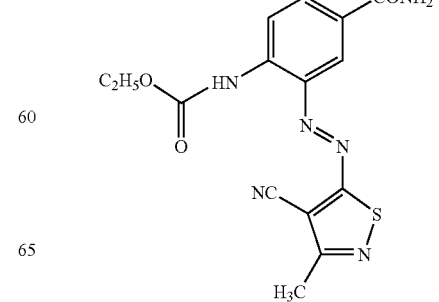

-continued
Y-39
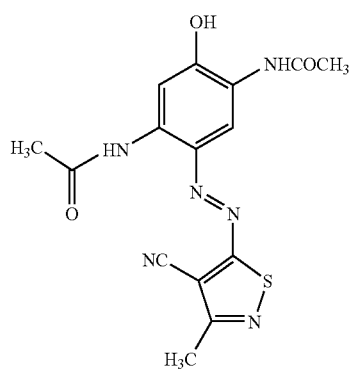
Y-40
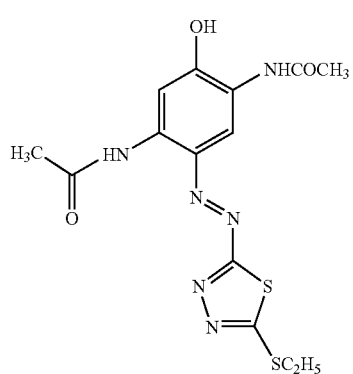
Y-41
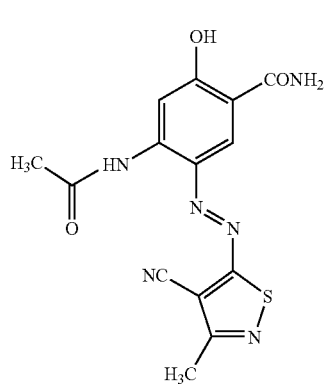
Y-42
-continued
Y-43
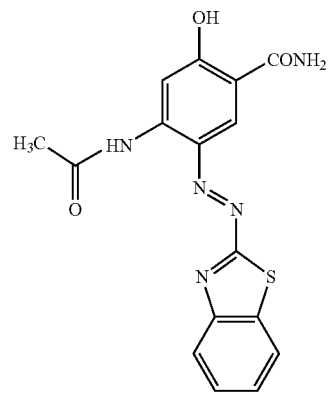
Y-44
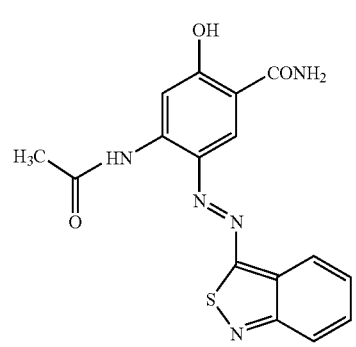
Y-45
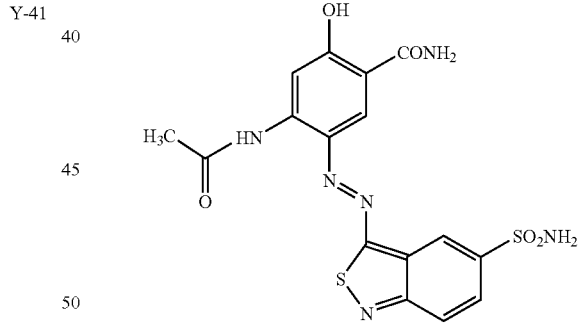
Y-46
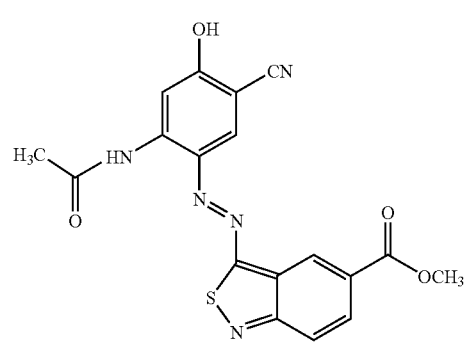

-continued
Y-47
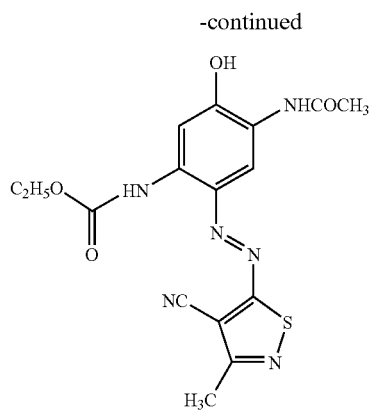
Y-48
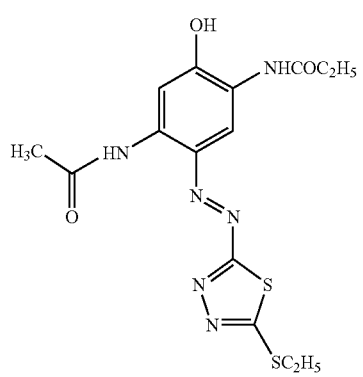
Y-49
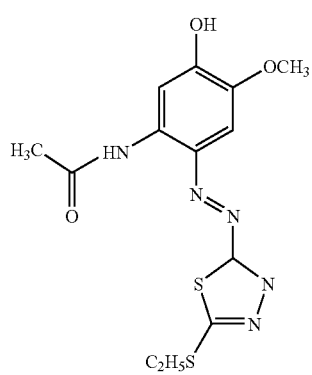
Y-50
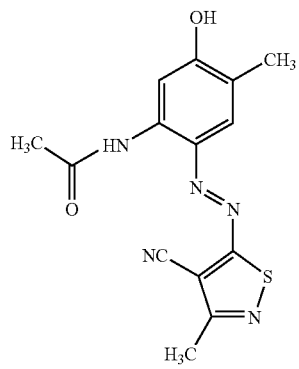
-continued
Y-51
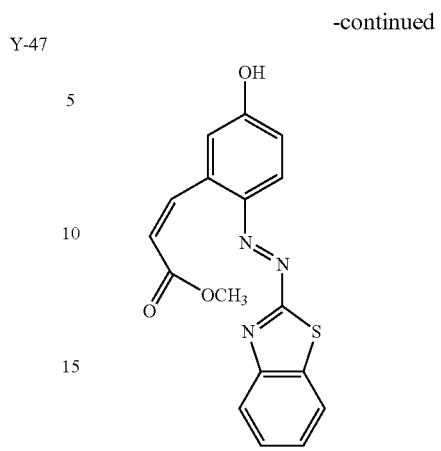
Y-52
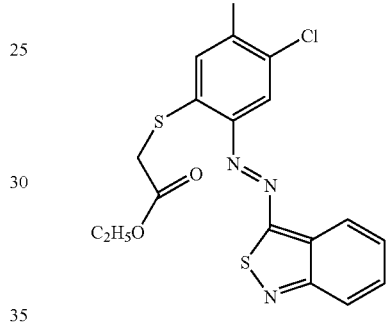
Y-53
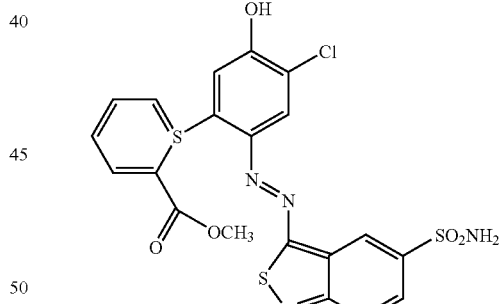
Y-54
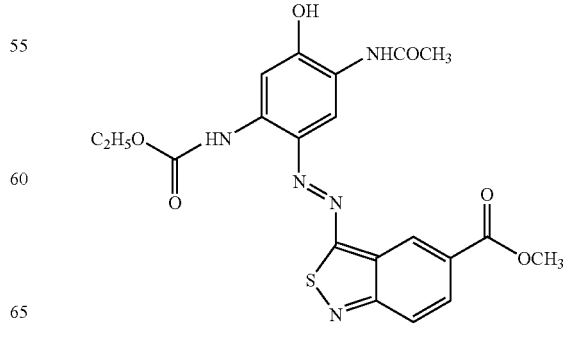

-continued

Y-55
Y-56
Y-57
Y-58
Y-59
Y-60
Y-61
Y-62

Y-63
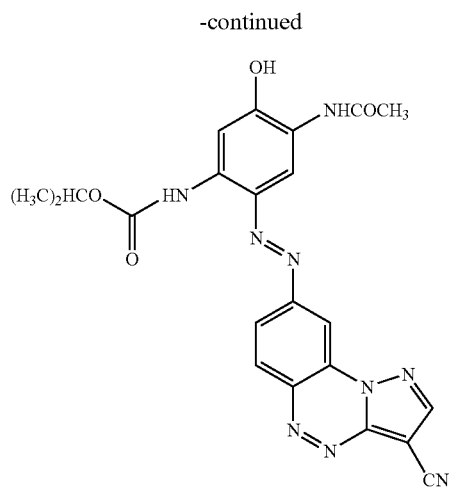
Y-64
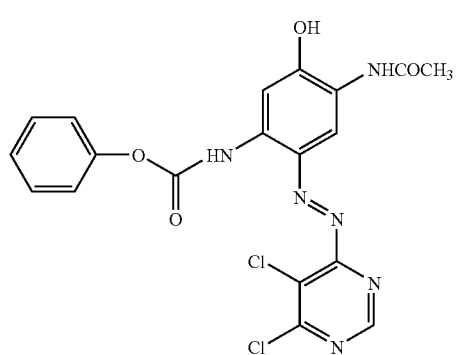
Y-65
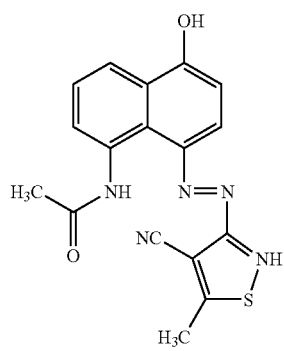
Y-66
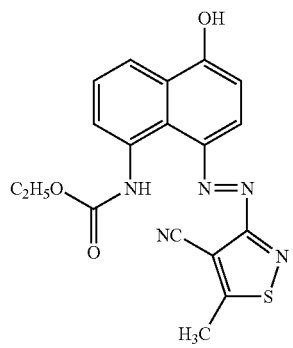
Y-67
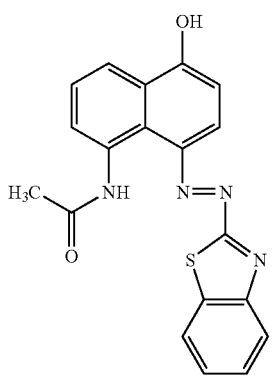
Y-68
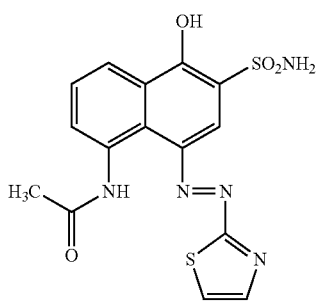
Y-69
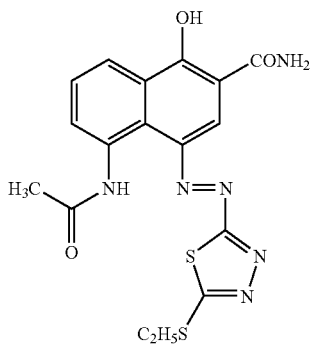
Y-70
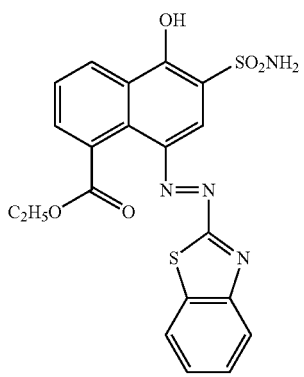

-continued
Y-71 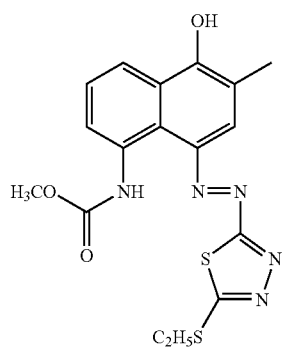
Y-72 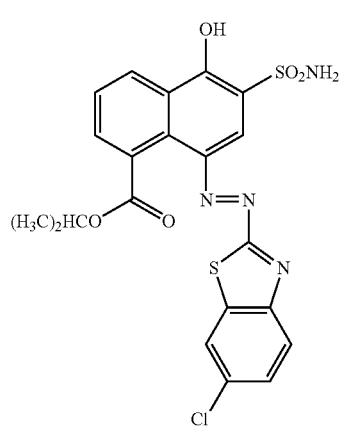
Y-73 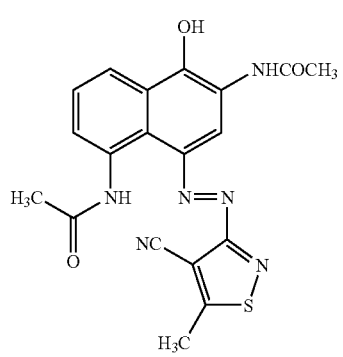
Y-74 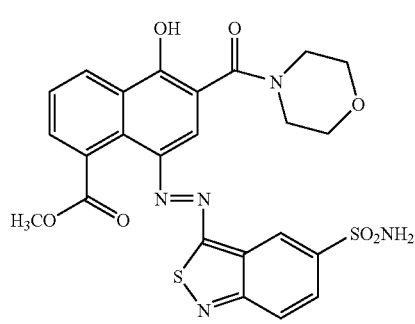
-continued
Y-75 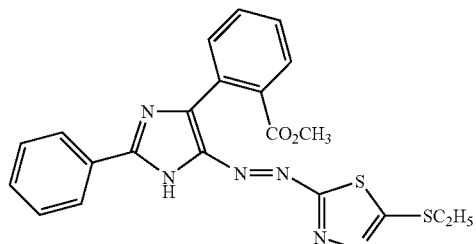
Y-76 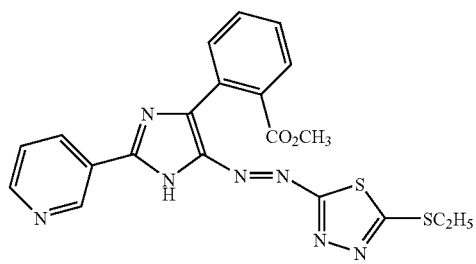
Y-77 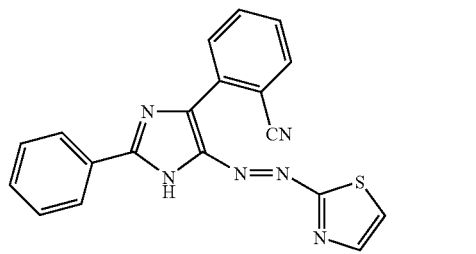
Y-78 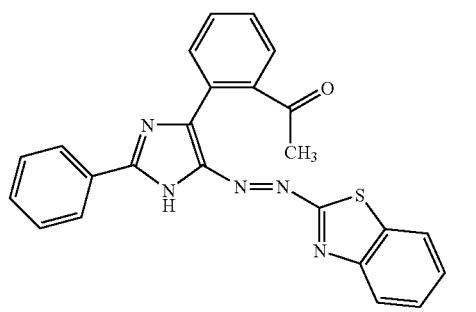
Y-79 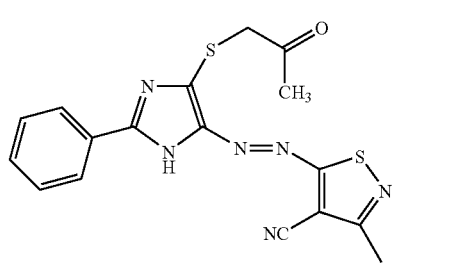
Y-80 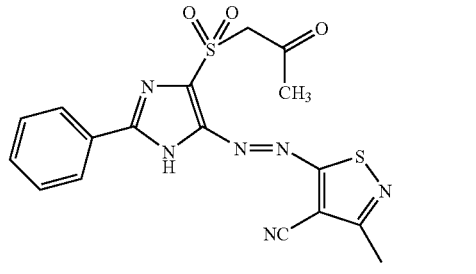

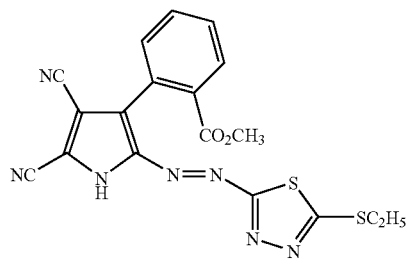
Y-81
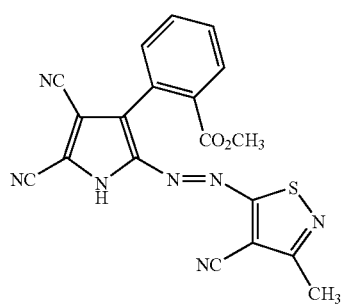
Y-82
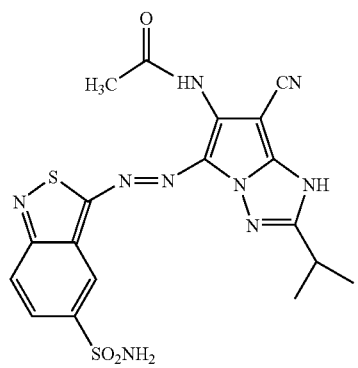
Y-83
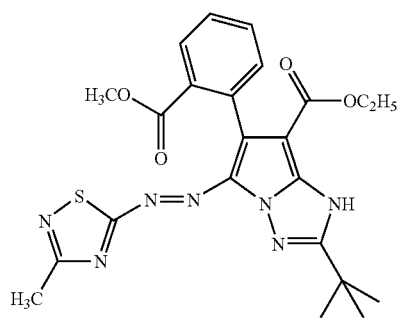
Y-84
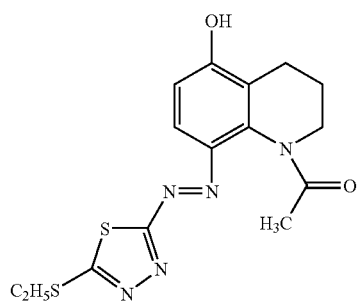
Y-85
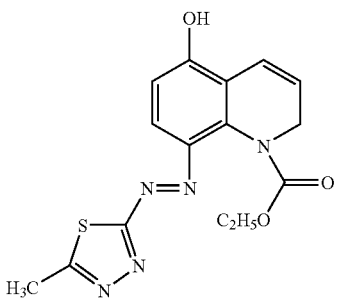
Y-86
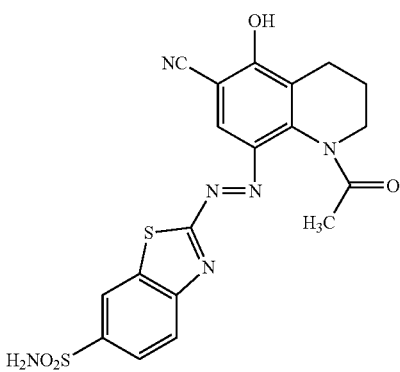
Y-87
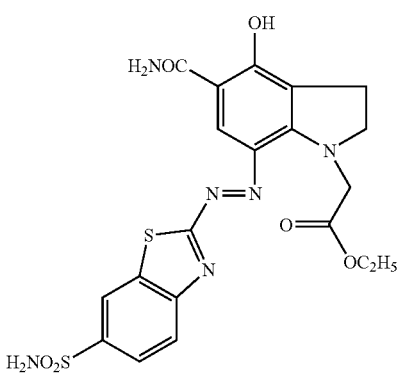
Y-88
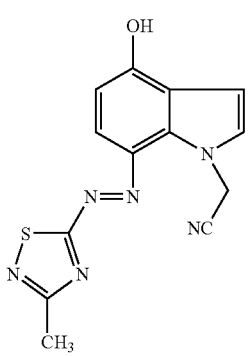
Y-89

-continued

Y-90 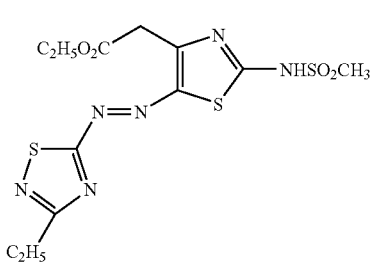

Y-91 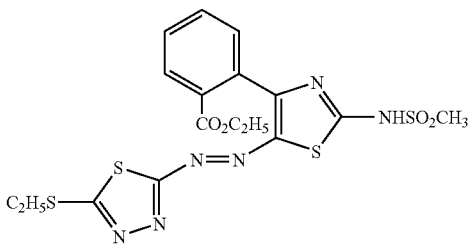

Y-92 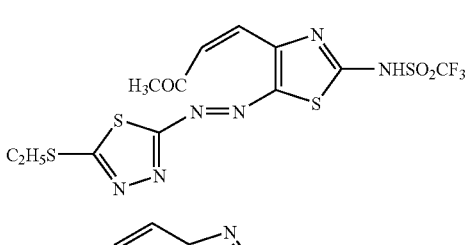

Y-93 

Y-94 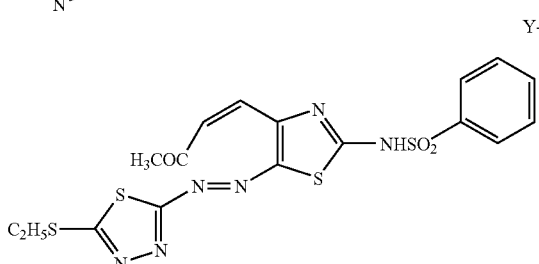

Y-95 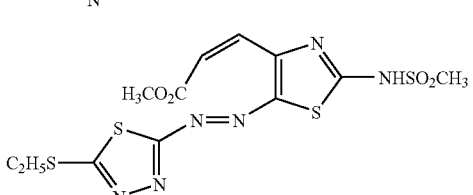

Y-96 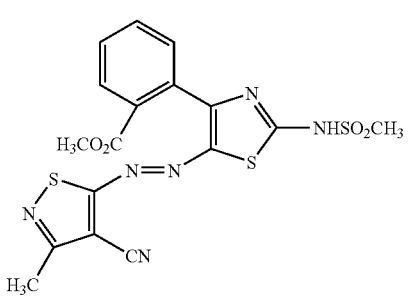

According to the present invention, it is possible to provide an azo dye excellent in dyeing properties a reductively decomposed product of which is converted into a stable compound.

The present invention will be described in more detail based on the following examples, but the invention is not limited thereto.

EXAMPLES

Example 1

Specific synthetic examples of the compounds represented by formula (I) are described below.

Synthetic Example 1

Synthesis of (Y-47)

(Y-47) was synthesized according to the following scheme.

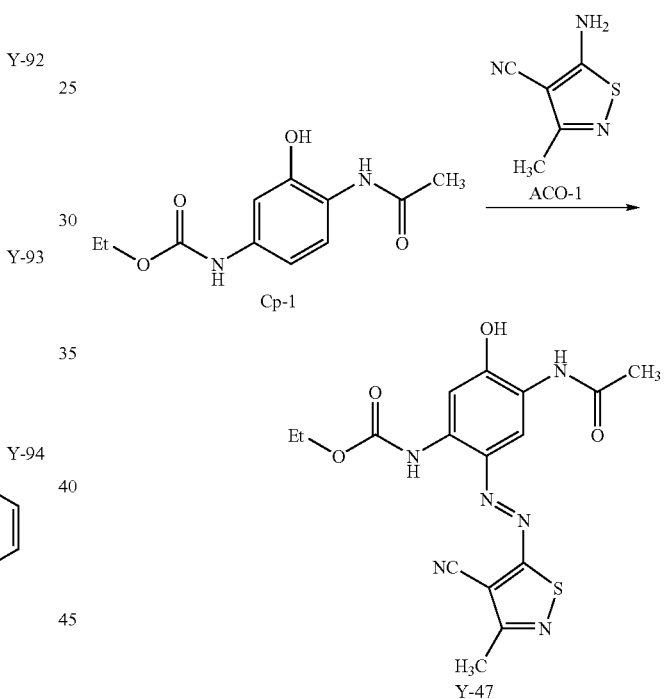

13.9 g of (AZO-1) were dissolved in 210 ml of phosphoric acid under water cooling, 7.6 g of sodium nitrite powder were added on ice, and the whole was stirred for 30 min. Then, 23.8 g of (Cp-1) were suspended and added to in 180 ml of a mixed solution of acetic acid/propionic acid at ½ on ice, and the whole was stirred for one hour.

After the reaction, the mixture was added to 2,000 ml of water, precipitated crystal was collected by filtration, and washed with 500 ml of water. The collected crystal was dissolved with heating in 150 ml of N-dimethyl acetamide, the mixture was stood to cool, and then 600 ml of methanol were added. Precipitated crystal was collected by filtration, and washed with 100 ml of methanol to yield 25 g of an exemplified compound (Y-47) as orange powder (yield 64.4%). Data from $^1$H-NMR on the yielded crystal is shown below.

$^1$H-NMR (300 MHz, DMSO) 9.51 (s, 1H), 9.34 (s, 1H), 8.48 (s, 1H), 7.75 (s, 1H), 4.20 (q, 2H), 2.57 (s, 1H), 2.11 (s, 3H), 1.30 (t, 3H).

Synthetic Example 2

Synthesis of (Y-40)

(Y-40) was synthesized according to the following scheme.

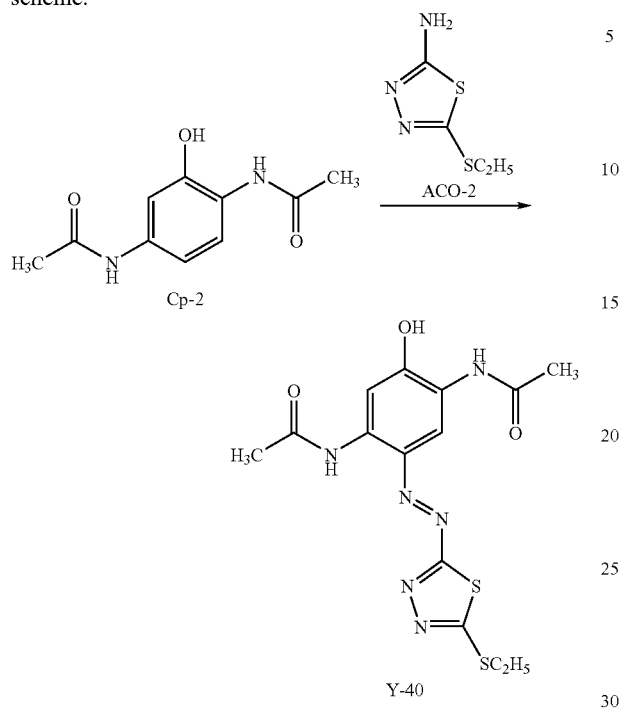

16.1 g of (AZO-2) were dissolved in 250 ml of phosphoric acid under water cooling, 7.6 g of sodium nitrite powder were added on ice, and the whole was stirred for 30 min. Then, 20.8 g of (Cp-2) were suspended and added to in 150 ml of a mixed solution of acetic acid/propionic acid at ½ on ice, and the whole was stirred for one hour. After the reaction, the mixture was added to 2,000 ml of water, precipitated crystal was collected by filtration, and washed with 500 ml of water. The collected crystal was dissolved with heating in 100 ml of N-dimethyl acetamide, the mixture was stood to cool, and then 500 ml of methanol were added. Precipitated crystal was collected by filtration, and washed with 100 ml of methanol to yield 29 g of an exemplified compound (Y-40) as orange powder (yield 76.2%). Data from $^1$H-NMR on the yielded crystal is shown below.

$^1$H-NMR (300 MHz, DMSO) 9.79 (s, 1H), 9.28 (s, 1H), 8.53 (s, 1H), 7.93 (s, 1H), 3.39 (q, 2H), 2.18 (s, 3H), 2.11 (s, 3H), 1.41 (t, 3H).

Synthetic Example 3

Synthesis of (Y-67)

(Y-67) was synthesized according to the following scheme.

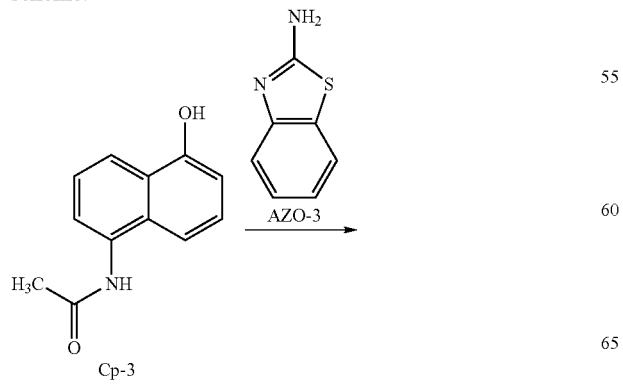

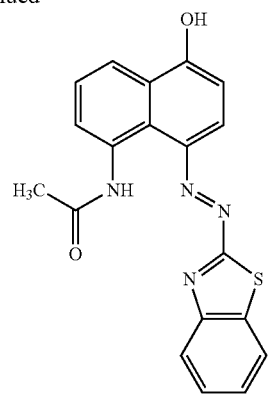

7.5 g of (AZO-3) were dissolved in 65 ml of phosphoric acid under water cooling, 3.45 g of sodium nitrite powder were added on ice, and the whole was stirred for 30 min. Then, 9.05 g of (Cp-3) were suspended and added to in 50 ml of a mixed solution of acetic acid/propionic acid at ½ on ice, and the whole was stirred for one hour. After the reaction, the mixture was added to 100 ml of water, precipitated crystal was collected by filtration, and washed with water. The collected crystal was dissolved with heating in 160 ml of N-dimethyl acetamide, the mixture was stood to cool, and then 700 ml of methanol were added. Precipitated crystal was collected by filtration, and washed with 100 ml of methanol to yield 13 g of an exemplified compound (Y-67) as orange powder (yield 61.8%). Data from $^1$H-NMR on the yielded crystal is shown below.

$^1$H-NMR (300 MHz, DMSO) 11.65 (s, 1H), 9.07 (s, 1H), 8.88 (d, 1H), 7.93 (d, 1H), 7.6-7.45 (m, 2H), 7.21-7.0 (m, 3H), 2.35 (s, 3H).

Synthetic Example 4

Synthesis of (Y-68)

(Y-68) was synthesized according to the following scheme.

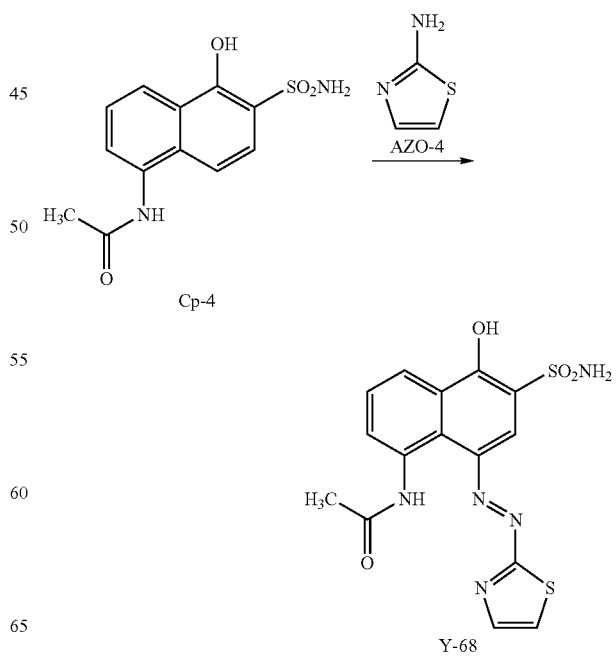

10.1 g of (AZO-4) were dissolved in 150 ml of phosphoric acid under water cooling, 7.6 g of sodium nitrite powder were added on ice, and the whole was stirred for 30 min. Then, 28 g of (Cp-4) were suspended and added to in 210 ml of a mixed solution of acetic acid/propionic acid at ½ on ice, and the whole was stirred for one hour. After the reaction, the mixture was added to 1,800 ml of water, precipitated crystal was collected by filtration, and washed with 500 ml of water. The collected crystal was dissolved with heating in 160 ml of N-dimethyl acetamide, the mixture was stood to cool, and then 700 ml of methanol were added. Precipitated crystal was collected by filtration, and washed with 100 ml of methanol to yield. 20 g of an exemplified compound (Y-68) as orange powder (yield 51.1%). Data from $^1$H-NMR on the yielded crystal is shown below.

$^1$H-NMR (300 MHz, DMSO) 13.00 (brs, 1H), 11.86 (s, 1H), 8.90 (d, 1H), 8.48 (d, 1H), 7.9-7.75 (m, 2H), 7.60-7.21 (m, 4H), 2.40 (s, 3H).

Example 2

The maximum absorbance wavelengths (λmax) and mol absorbance coefficients (ε) in dimethylformamide of the dyes of the present invention were shown in Table 1.

TABLE 1

| The dyes of the present invention | The maximum absorbance wavelengths (λmax) | The absorbance coefficients (ε) |
|---|---|---|
| Y-47 | 559 nm | $6.0 \times 10^4$ |
| Y-48 | 552 nm | $5.0 \times 10^4$ |
| Y-67 | 579 nm | $4.0 \times 10^4$ |
| Y-68 | 581 nm | $4.0 \times 10^4$ |

Example 3

The dyes (Y-48) and (Y-67) of the present invention were analyzed for products after the azo group had been reductively decomposed by means of experiments shown in the following scheme. (T-1) was used as a comparative dye.

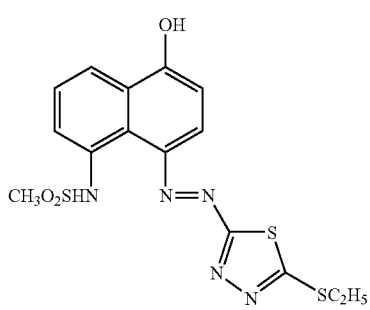
T-1

29.3 g of (Y-48) were suspended in 500 ml of methanol and 250 ml of water, and 67.0 g of hydrosulfite soda were added in some portions at room temperature. After the reaction, 750 ml of water were added, and precipitated crystal was collected by filtration. The yielded crystal was analyzed, and consequently identified as a cyclized product C-48.

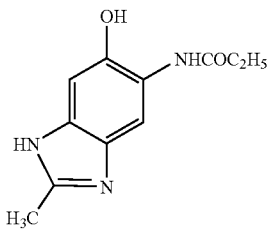
C-48

7.24 g of (Y-67) were suspended in 160 ml of methanol and 80 ml of water, and 17.4 g of hydrosulfite soda were added in some portions at room temperature. After the reaction, 80 ml of water were added, and precipitated crystal was collected by filtration. The yielded crystal was analyzed, and consequently identified as a cyclized product C-67. An isolation yield was 91.6%.

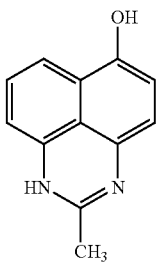
C-67

In addition, the similar experiment was performed using the comparative pigment (T-1), but no cyclized product was yielded. After the azo group had been reductively decomposed, only a further degraded complex mixture was yielded.

The above results have shown that the azo dye of the present invention is an azo dye where the azo group is reductively decomposed, subsequently nitrogen atoms of the reduced azo group cause an intramolecular nucleophilic substitution reaction to form a stable and highly safe cyclic compound in which the nitrogen atoms are incorporated.

Having described our invention as related to the present embodiments, it is our intention that the invention not be limited by any of the details of the description, unless otherwise specified, but rather be construed broadly within its spirit and scope as set out in the accompanying claims.

What we claim is:

1. An azo dye represented by formula (I):

$$A-N=N-B \qquad \text{formula (I)}$$

wherein, A is a group represented by the formula (A7):

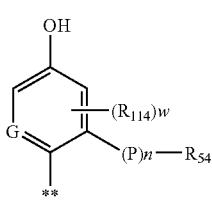
(A7)

wherein ** of formula (A7) represents a site which is bound to the azo group in the formula (I), G represents substituted or unsubstituted methine, or a nitrogen atom, $R_{114}$ represents a halogen atom, or an alkyl group, an aryl group, a heterocyclic group, a nitro group, a carboxyl group, an alkoxy group, an aryloxy group, an amino group, an acylamino group, an alkoxycarbonyl amino group, an aminocarbonyl amino group, an alkylsulfonyl amino group, an arylsulfonyl amino group, an alkylthio group, an arylthio group, a heterocyclic thio group, a cyano group, an alkoxycarbonyl group, or a carbamoyl group, w represents an integer of 1 to 3, n represents an integer of 0 to 2, P represents an oxygen atom, sulfur atom, $-C(R^1)_2-$ or $-N(R^2)-$ ($R^1$ and $R^2$ each represents a hydrogen atom, a substituted or unsubstituted alkyl group having 1 to 10 carbon atoms, or a substituted or unsubstituted aryl group having 6 to 10 carbon atoms), and $R_{54}$ represents a cyano group, an alkoxycarbonyl group, an aryloxycarbonyl group, a heterocyclic oxycarbonyl group, a carbamoyl group, or an acyl group, or a group represented by the following formula (II):

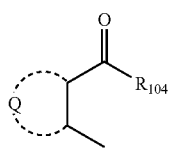

formula (II)

wherein Q represents an atomic group required for forming a ring, and $R_{104}$ represents a substituted or unsubstituted alkyl group, a substituted or unsubstituted aryl group, an alkoxy group, an aryloxy group, a heterocyclic oxy group, or a perfluoroalkyl group, and wherein n is 0 when $R_{54}$ is represented by the formula (II), and wherein the group A represented by formula (A7) has a substituent required for inducing an intramolecular nucleophilic substitution reaction with a nitrogen atom of a reduced azo group as a nucleophilic species when the azo group is reductively decomposed, the group forming a compound containing the nitrogen atom in a ring structure, and B is bound to the azo group through a carbon atom, wherein the B is represented by any one of formulae (B2)-(B19), (B21), (B22), (B24) and (B25):

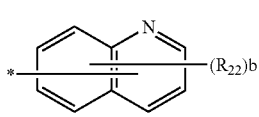 (B2)

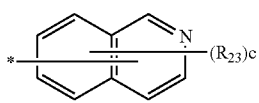 (B3)

-continued

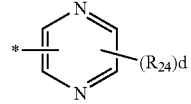 (B4)

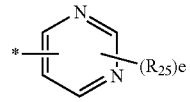 (B5)

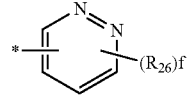 (B6)

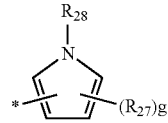 (B7)

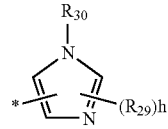 (B8)

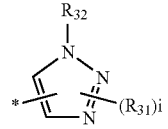 (B9)

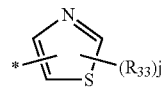 (B10)

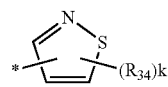 (B11)

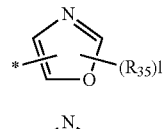 (B12)

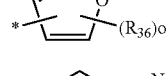 (B13)

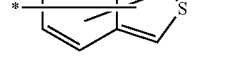 (B14)

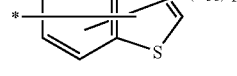 (B15)

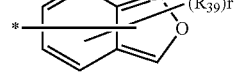 (B16)

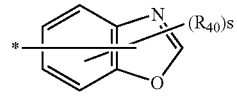 (B17)

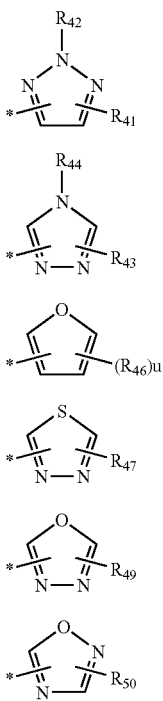

wherein, the mark "*" indicates the position at which the group bonds to the azo group in the compound represented by formula (I), $R_{22}$ to $R_{44}$, $R_{46}$, $R_{47}$, $R_{49}$ and $R_{50}$ each independently represents a halogen atom, an alkyl group, an alkenyl group, an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkyl thio group, an aryl thio group, a heterocyclic thio group, a sulfamoyl group, a sulfo group, an alkyl sulfinyl group, an aryl sulfinyl group, an alkyl sulfonyl group, an aryl sulfonyl group, an acyl group, an alkoxycarbonyl group, an aryloxycarbonyl group, a carbamoyl group, an aryl azo group, a heterocyclic azo group, an imide group, a phosphino group, a phosphinyl group, a phosphinyloxy group, a phosphinylamino group, and a silyl group; p, q, r, and s each represents an integer of 0 to 4, b and c each represents an integer of 0 to 6, d, e, f, g, and u each represents an integer of 0 to 3, h, j, k, l, and o each represents an integer of 0 to 2, and i is 0 or 1.

2. The azo dye represented by formula (I) according to claim 1, wherein the group A represented by formula (A7) has an acylamino group.

3. A dye composition comprising the azo dye represented by formula (I) according to claim 1.

* * * * *